United States Patent
Kan et al.

(10) Patent No.: US 10,027,812 B1
(45) Date of Patent: *Jul. 17, 2018

(54) MATCHING USING AGENT/CALLER SENSITIVITY TO PERFORMANCE

(71) Applicant: Afiniti International Holdings, Ltd., Hamilton (BM)

(72) Inventors: Ittai Kan, McLean, VA (US); Zia Chishti, Washington, DC (US); Akbar A. Merchant, Bethesda, MD (US)

(73) Assignee: Afiniti International Holdings, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,687

(22) Filed: Jun. 27, 2016

Related U.S. Application Data

(63) Continuation of application No. 14/035,522, filed on Sep. 24, 2013, now Pat. No. 9,462,127.

(Continued)

(51) Int. Cl.
*H04M 3/00* (2006.01)
*H04M 3/523* (2006.01)
*H04M 3/51* (2006.01)

(52) U.S. Cl.
CPC ....... *H04M 3/5233* (2013.01); *H04M 3/5175* (2013.01); *H04M 3/5191* (2013.01); *H04M 2203/402* (2013.01)

(58) Field of Classification Search
CPC ............ H04M 3/5233; H04M 3/5232; H04M 3/5175; H04M 3/523; H04M 3/5183; G06Q 10/06398

(Continued)

(56) References Cited

U.S. PATENT DOCUMENTS 5,155,763 A    10/1992   Bigus et al.
5,206,903 A     4/1993   Kohler et al.
(Continued)

FOREIGN PATENT DOCUMENTS

AU    2008349500 C1    5/2014
AU    2009209317 B2    5/2014
(Continued)

OTHER PUBLICATIONS

International Search Report and Written Opinion issued by the European Patent Office as International Searching Authority for International Application No. PCT/IB2016/001762 dated Feb. 20, 2017 (15 pages).

(Continued)

*Primary Examiner* — Rasha Al Aubaidi
(74) *Attorney, Agent, or Firm* — Wilmer Cutler Pickering Hale and Dorr LLP

(57) ABSTRACT

A method, system and program product, the method comprising: obtaining for each call in one set of calls a respective pattern representing multiple different respective data fields; obtaining performance data for the respective patterns of the calls; obtaining performance data for the respective agents; determining agent performance sensitivity to call pattern performance for agents in a set of agents comprising the agent performance data correlated to call performance data for the calls the agent handles; and matching a respective one of the agents from the set of agents to one of the calls based at least in part on the performance data for the respective pattern of the one call and on the agent sensitivity to call performance for the respective one agent of the set of agents.

20 Claims, 16 Drawing Sheets

Related U.S. Application Data

(60) Provisional application No. 61/705,040, filed on Sep. 24, 2012.

(58) Field of Classification Search
USPC .......... 379/265.01–265.02, 265.05–265.06, 379/265.11–265.12, 266.01–266.02
See application file for complete search history.

(56) References Cited

U.S. PATENT DOCUMENTS

| | | | |
|---|---|---|---|
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |
| 5,926,538 A | 7/1999 | Deryugin et al. | |
| 6,021,428 A | 2/2000 | Miloslaysky | |
| 6,044,468 A | 3/2000 | Osmond | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 6/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,519,568 B1 | 2/2003 | Harvey et al. | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,856,869 B1 | 10/2014 | Brinskelle | |
| 8,879,715 B2 | 11/2014 | Spottiswoode et al. | |
| 8,903,079 B2 | 12/2014 | Xie et al. | |
| 8,929,537 B2 | 1/2015 | Chishti et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 2001/0032120 A1 | 10/2001 | Stuart et al. | |
| 2001/0044896 A1 | 11/2001 | Schwartz et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |
| 2004/0101127 A1 | 5/2004 | Dezonno et al. | |
| 2004/0109555 A1 | 6/2004 | Williams | |

(56) References Cited

U.S. PATENT DOCUMENTS

| | | |
|---|---|---|
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1* | 2/2005 | McConnell ......... H04M 3/5232 379/265.02 |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0341370 A1 | 11/2014 | Li et al. |
| 2015/0055772 A1 | 2/2015 | Klemm et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| JP | 11-098252 A | 4/1999 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649675 B2 | 1/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Anonymous. (2006) "Performance Based Routing in Profit Call Centers," The Decision Makers' Direct, Issue Jan. 6, 2012 (3 pages).

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, pp. 829-836 (Dec. 1979).

Gans, N. et al. (2003), "Telephone Call Centers: Tutorial, Review and Research Prospects," Manufacturing & Service Operations Management, vol. 5, No. 2, pp. 79-141.

International Preliminary Report on Patentability issued in connection with PCT Application No. PCT/US2009/066254 dated Jun. 14, 2011 (6 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

(56) References Cited

OTHER PUBLICATIONS

International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1-2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 4, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.

* cited by examiner

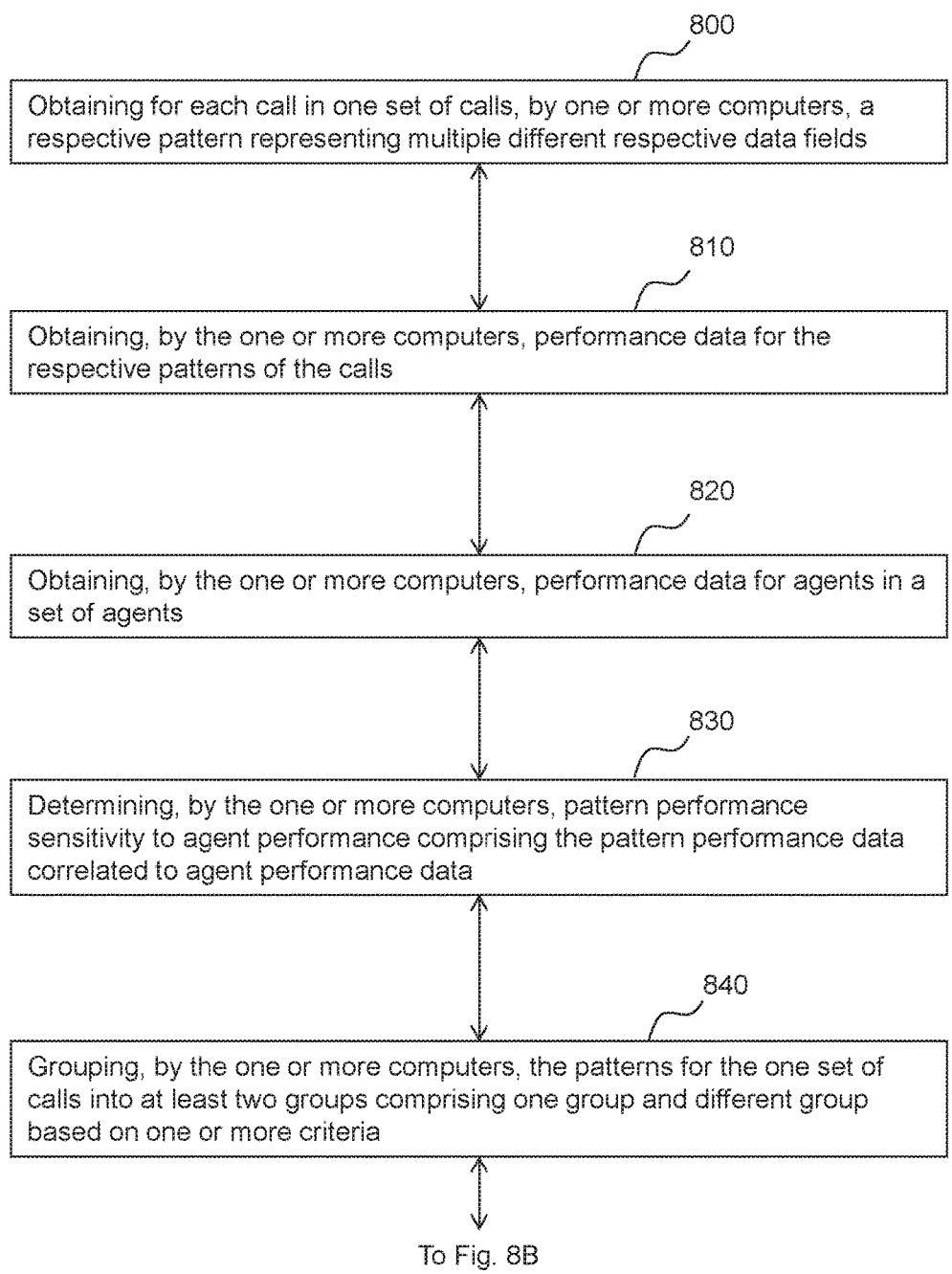

MATCHING USING AGENT/CALLER SENSITIVITY TO PERFORMANCE

CROSS REFERENCE TO RELATED APPLICATIONS

This application is a continuation of U.S. patent application Ser. No. 14/035,522, filed Sep. 24, 2013, which claims priority from Provisional U.S. Application 61/705,040 filed Sep. 24, 2012, each of which is hereby incorporated by reference in their entirety as if fully set forth herein.

BACKGROUND OF THE DISCLOSURE

The present disclosure relates to the field of routing phone calls and other telecommunications in a contact center system.

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents over the telephone are referred to in this application as a "caller." The individuals acquired by the contact center to interact with callers are referred to in this application as an "agent."

A piece of hardware for any contact center operation is the switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Contact routing in an inbound contact center is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

In an outbound contact center environment using telephone devices, the contact center or its agents are typically provided a "lead list" comprising a list of telephone numbers to be contacted to attempt some solicitation effort, such as attempting to sell a product or conduct a survey. The lead list can be a comprehensive list for all contact centers, one contact center, all agents, or a sub-list for a particular agent or group of agents (in any such case, the list is generally referred to in this application as a "lead list"). After receiving a lead list, a dialer or the agents themselves will typically call through the lead list in numerical order, obtain a live caller, and conduct the solicitation effort. In using this standard process, the eventual matches and connections between a caller and an agent are essentially random.

There is a need for improving on the available mechanisms for matching and connecting a caller to an agent. The present disclosure reflects this.

BRIEF SUMMARY OF THE DISCLOSURE

In embodiments, a method may comprise: obtaining for each call in one set of calls, by the one or more computers, a respective pattern representing one or multiple different respective data fields; obtaining, by the one or more computers, performance data for the respective patterns of the calls; obtaining, by the one or more computers, performance data for respective agents in a set of agents; determining, by the one or more computers, agent performance sensitivity to call pattern performance for agents in the set of agents comprising the agent performance data correlated to the call performance data for the calls the agent has handled; and matching, by the one or more computers, a respective one of the agents from the set of agents to one of the calls based at least in part on the performance data for the respective pattern of the one call and on the agent sensitivity to call performance for the respective one agent of the set of agents.

In embodiments, the determining agent performance sensitivity to call pattern performance for agents in a set of agents may comprise correlating agent performance to call performance data for the calls the agent has handled in a data set.

In embodiments, the method may further comprise: percentiling or ranking, by the one or more computers, the respective patterns for the set of calls based at least in part on their respective performance data; percentiling or ranking, by the one or more computers, the agents in the set of agents based at least in part on the agent performance sensitivity to call pattern performance, wherein the matching is based at least in part on the percentile or ranking of the respective pattern of the one call and the percentile or ranking by agent performance sensitivity to call pattern performance of the one agent.

In embodiments, the pattern may be abstracted in whole or in part, so that a meaning for the field data in the pattern is not known by the system.

In embodiments, the performance data may be based on at least one selected from the group of sales, retention of the caller in a program, call handle time, customer satisfaction, revenue, first call resolution, units sold, and transaction points.

In embodiments, the method may further comprise: matching, by the one or more computers, a different set of calls to agents using a different matching algorithm; comparing, performance data from call-agent matches of the different set of calls using the different matching algorithm with performance data for the one set of calls matched based at least in part on the agent sensitivity to call performance; and generating, by the one or more computers, a report or display data for the performance comparing results from using the matching algorithm based at least in part on agent sensitivity to call performance against performance using the different matching algorithm.

In embodiments, a method may comprise: obtaining for each call in one set of calls, by the one or more computers, a respective pattern representing one or multiple different respective data fields; obtaining, by the one or more computers, performance data for the respective patterns of the calls; obtaining, by the one or more computers, agent performance data for respective agents in a set of agents; determining, by the one or more computers, agent performance sensitivity to call pattern performance comprising the agent performance data correlated to the pattern performance data for the calls the agent has handled; grouping, by the one or more computers, the set of agents into at least two groups comprising one group and a different group based at least in part on the agent performance data; matching for the one group of the agents, by the one or more computers, a respective one of the agents from the one group to one of the calls based at least in part on the performance data for the pattern of the one call and the performance data of the respective one agent in the one group; and matching for the different group of the agents, by the one or more computers, a respective one of the agents from the different group of agents to a different one of the calls based at least in part on the performance data for the pattern of the one call and the agent performance sensitivity to call pattern performance for the one agent in the different group. Note that in other embodiments, the groupings may be by ranges of other parameters, such as call count ranges, or call handle time ranges, or regions, or demographic data, to name a few. The breakpoint between the ranges may be determined empirically and/or based on the availability of data for that element.

In embodiments, the determining agent performance sensitivity to call pattern performance for agents in a set of agents may comprise correlating agent performance to call performance data for the calls the agent has handled in a data set.

In embodiments, the method may further comprise: percentiling or ranking, by the one or more computers, the respective patterns in the set of calls based at least in part on their respective performance data; and percentiling or ranking, by the one or more computers, the agents in the set of agents based at least in part on the agent performance data; percentiling or ranking, by the one or more computers, the agents in the set of agents based at least in part on their agent performance sensitivity to call pattern performance; wherein the matching for the one group is based at least in part on the percentile or ranking of the respective pattern of the one call and the percentile or ranking of the one agent in the one group, and wherein the matching for the different group is based at least in part on the percentile or ranking of the respective pattern of the one call and the percentile or ranking by agent sensitivity to call performance of the one agent in the different group.

In embodiments, the method may further comprise: percentiling or ranking, by the one or more computers, the agents based at least in part on the agent performance data; wherein the grouping may be based at least in part on the performance percentiles or rankings of the agents, with the agents in one of the groups having lower percentiles or rankings than agents in the different group. In embodiments, a percentile or ranking break point between the one group and the different group may be determined based on one or more criteria.

In embodiments, the matching steps may be performed concurrently. In embodiments, the matching steps may performed consecutively or with partial overlap in time.

In embodiments, the method may further comprise: matching, by the one or more computers, a different set of calls to agents using a different matching algorithm; comparing, performance from call-agent matches of the different set of calls using the different matching algorithm with performance for the one set of calls using a combination of the matching of the one group of agents to calls and the matching of the different group of agents to calls; and generating, by the one or more computers, a report or display data for the performance comparing results from using the combination of matching algorithms against performance using the different matching algorithm.

In embodiments, a system may comprise: one or more computers configured with the following components: a call data extractor component for obtaining for each call in one set of calls a respective pattern representing one or multiple different respective data fields; a call pattern performance extractor for obtaining performance data for the respective patterns of the calls; an agent performance extractor component for obtaining performance data for respective agents in a set of agents; an agent sensitivity to call performance correlation engine for determining agent performance sensitivity to call pattern performance for agents in a set of agents comprising the agent performance data correlated to the call performance data for the calls the agent has handled; and a matching engine for matching a respective one of the agents from the set of agents to one of the calls based at least in part on the performance data for the respective pattern of the one call and on the agent sensitivity to call performance for the respective one agent of the set of agents.

In embodiments, the system may further comprise: a first percentile or ranking engine configured for percentiling or ranking the patterns in the set of calls based at least in part on their respective performance data; and a second percentile or ranking engine configured for percentiling or ranking the respective agents in the set of agents based at least in part on their respective agent performance sensitivity to call performance; wherein the matching engine is configured to perform matching based at least in part on the percentile or ranking of the one call and the percentile or ranking by agent performance sensitivity to call performance.

In embodiments, a system may comprise: one or more computers configured with the following components: a call data extractor component for obtaining for each call in one set of calls a respective pattern representing one multiple different respective data fields; a call pattern performance extractor for obtaining performance data for the respective patterns of the calls; an agent performance extractor component for obtaining agent performance data for respective agents in a set of agents; an agent performance sensitivity to call pattern performance correlation engine for determining agent sensitivity to call performance comprising the agent performance data correlated to the pattern performance data for the calls the agent has handled; a grouping engine configured for grouping the set of agents into at least two groups comprising one group and a different group based at least in part on the agent performance data; a first matching engine configured for matching a respective one of the agents from the one group to one of the calls based at least in part on the performance data for the pattern of the one call and the performance data of the respective one agent in the one group; and a second matching engine configured for matching for the different group of the agents a respective one of the agents from the different group of agents to a different one of the calls based at least in part on the performance data for the pattern of the one call and the agent sensitivity to call performance for the one agent in the different group. Note that in other embodiments, the groupings may be by ranges of other parameters, such as call handle time ranges, or regions, or demographic data, to name a few. The breakpoint between the ranges may be determined empirically and/or by data availability for the parameter or by one or more other parameters.

In embodiments, the system may further comprise: a first percentile or ranking engine for percentiling or ranking the respective patterns in the set of calls based at least in part on their respective performance data; a second percentile or ranking engine for percentiling or ranking the agents in the set of agents based at least in part on the agent performance data; a third percentile or ranking engine for percentiling or ranking the agents in the set of agents based at least in part on their agent performance sensitivity to call pattern performance; wherein the first matching engine is configured for matching the one group based at least in part on the percentile or ranking of the respective pattern of the one call and the percentile or ranking of the one agent in the one group, and wherein the second matching engine is configured for matching the different group based at least in part on the percentile or ranking of the respective pattern of the one call and the percentile or ranking by agent sensitivity to call performance of the one agent in the different group.

In embodiments, the system may further comprise: a percentile or ranking engine for percentiling or ranking the agents based at least in part on the agent performance data; wherein the grouping may be based at least in part on the performance percentiles or rankings of the agents, with the agents in one of the groups having lower percentiles or rankings than agents in the different group. In embodiments, the grouping engine may be configured for setting a percentile or ranking break point between the one group and the different group based on one or more criteria.

In embodiments, a method may comprise: obtaining for each call in one set of calls, by the one or more computers, a respective pattern representing one multiple different respective data fields; obtaining, by the one or more computers, performance data for the respective patterns of the calls; obtaining, by the one or more computers, performance data for respective agents in a set of agents; determining, by the one or more computers, agent performance sensitivity to call pattern performance for agents in a set of agents comprising the agent performance data correlated to the call performance data for the calls the agent has handled; determining, by the one or more computers, pattern performance sensitivity to agent performance comprising the pattern performance data correlated to the agent performance data; and matching, by the one or more computers, a respective one of the agents from the set of agents to one of the calls based at least in part on the pattern performance sensitivity to agent performance for the respective pattern of the one call and on the agent sensitivity to call performance for the respective one agent of the set of agents.

BRIEF DESCRIPTION OF THE DRAWINGS

FIG. 8A is a flowchart reflecting further embodiments of the present disclosure for performing matching using pattern performance sensitivity to agent performance.

DETAILED DESCRIPTION OF EMBODIMENTS

Figure 1:
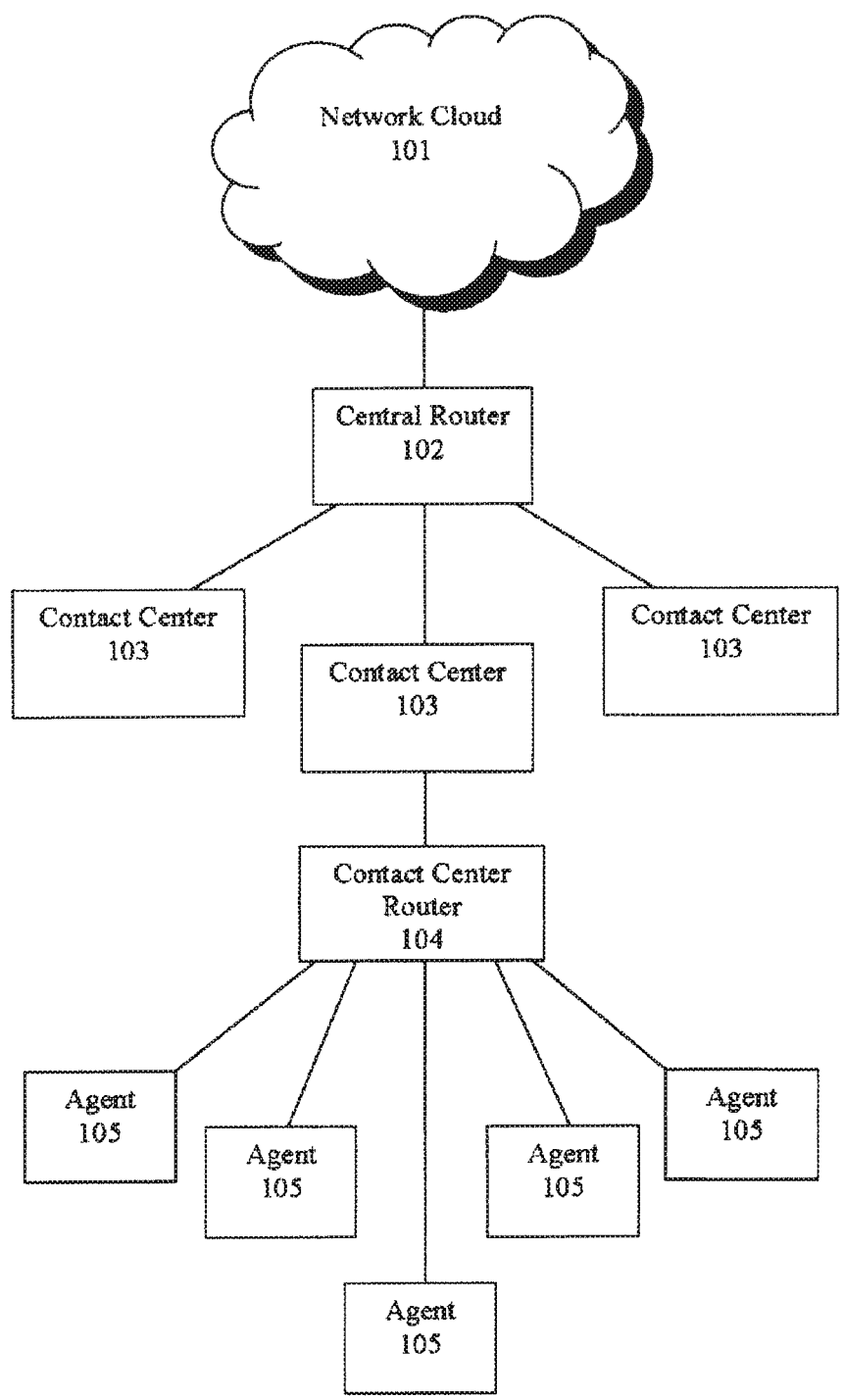
FIG. 1 is a diagram reflecting the general setup of a contact center operation.

The following description is presented to enable a person of ordinary skill in the art to make and use embodiments of the present disclosure, and is provided in the context of particular applications and their requirements. Various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that embodiments of the present disclosure might be practiced without the use of these specific details. In other instances, well-known structures and devices are shown in block diagram form in order not to obscure the description of the present disclosure with unnecessary detail. Thus, the present disclosure is not intended to be limited to the embodiments shown, but is to be accorded the widest scope consistent with the principles and features disclosed herein.

While the present disclosure is described in terms of particular examples and illustrative figures, those of ordinary skill in the art will recognize that the present disclosure is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments in accordance with the present disclosure.

Exemplary call mapping and routing systems and methods are described, for example, in "Systems and Methods for Routing Callers to an Agent in a Contact Center," filed on Jul. 25, 2008, bearing Ser. No. 12/180,382 (now U.S. Pat. No. 8,359,219); in U.S. patent application Ser. No. 12/267,471, entitled "Routing Callers to Agents Based on Time Effect Data," filed on Nov. 7, 2008; Ser. No. 12/490,949, entitled "Probability Multiplier Process for Call Center Routing," filed on Jun. 24, 2009; and Ser. No. 12/266,418, entitled, "Pooling Callers for Matching to Agents Based on Pattern Matching Algorithms," filed on Nov. 6, 2008, U.S. patent application Ser. No. 12/051,251 filed on Jan. 28, 2008; U.S. patent application Ser. No. 12/267,471 filed on Jan. 28, 2010; provisional application No. 61/084,201 filed Jul. 28, 2008, U.S. patent application Ser. No. 13/843,807 filed on Mar. 15, 2013; U.S. patent application Ser. No. 13/843,541 filed on Mar. 13, 2013; U.S. patent application Ser. No. 13/843,724 filed on Mar. 15, 2013, and application Ser. No. 14/032,657 filed Sep. 20, 2013, titled "Use of Abstracted Data in Pattern Matching System," all of which are incorporated herein by reference in their entirety.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
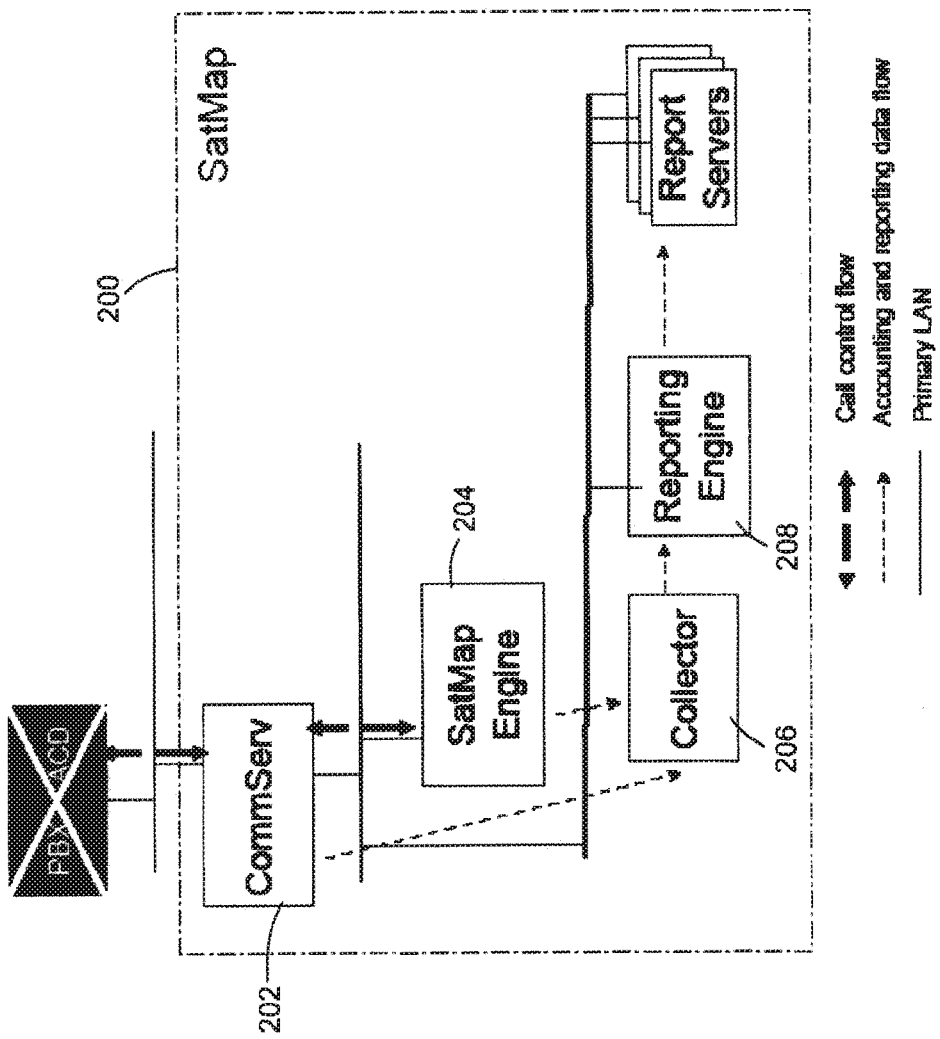
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary pattern matching and computer model systems and methods which may be included with content routing system and/or routing engine 204 are described, for example, in U.S. patent application Ser. No. 12/021,251, filed Jan. 28, 2008, and U.S. Serial No. U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. In embodiments to be described below, the collector may configured in the one or more computers to obtain performance data for agents in a set of agents. In embodiments, the collector may further be configured to obtain a respective abstracted data stream for each of multiple of the calls, with each respective data stream having multiple different locations along the abstracted data stream representing multiple different respective fields, wherein the meaning for the field data in the respective different locations for the different respective fields is not known by the system, and to determine from respective field data positions in the respective data streams respective patterns for the respective data streams.

In embodiments, the collector may further be configured in the one or more computers to obtain performance data for the respective patterns. In yet further embodiments, the collector may be configured to rearrange the data to an order of a data set to be used to correlation where the abstracted data stream is scrambled. In embodiments, the collector may further be configured in the one or more computers to determine field positions for the fields in the abstracted data stream; and to select only the determined field positions from the data stream to form the pattern. In embodiments, for multiple abstracted data streams received during the period, the abstracted data for the different fields may be received in two or more different orders over the course of the period of time, and the collector may be further configured in the one or more computers to arrange the field data for the different fields for the data streams of the respective calls in a same order.

Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
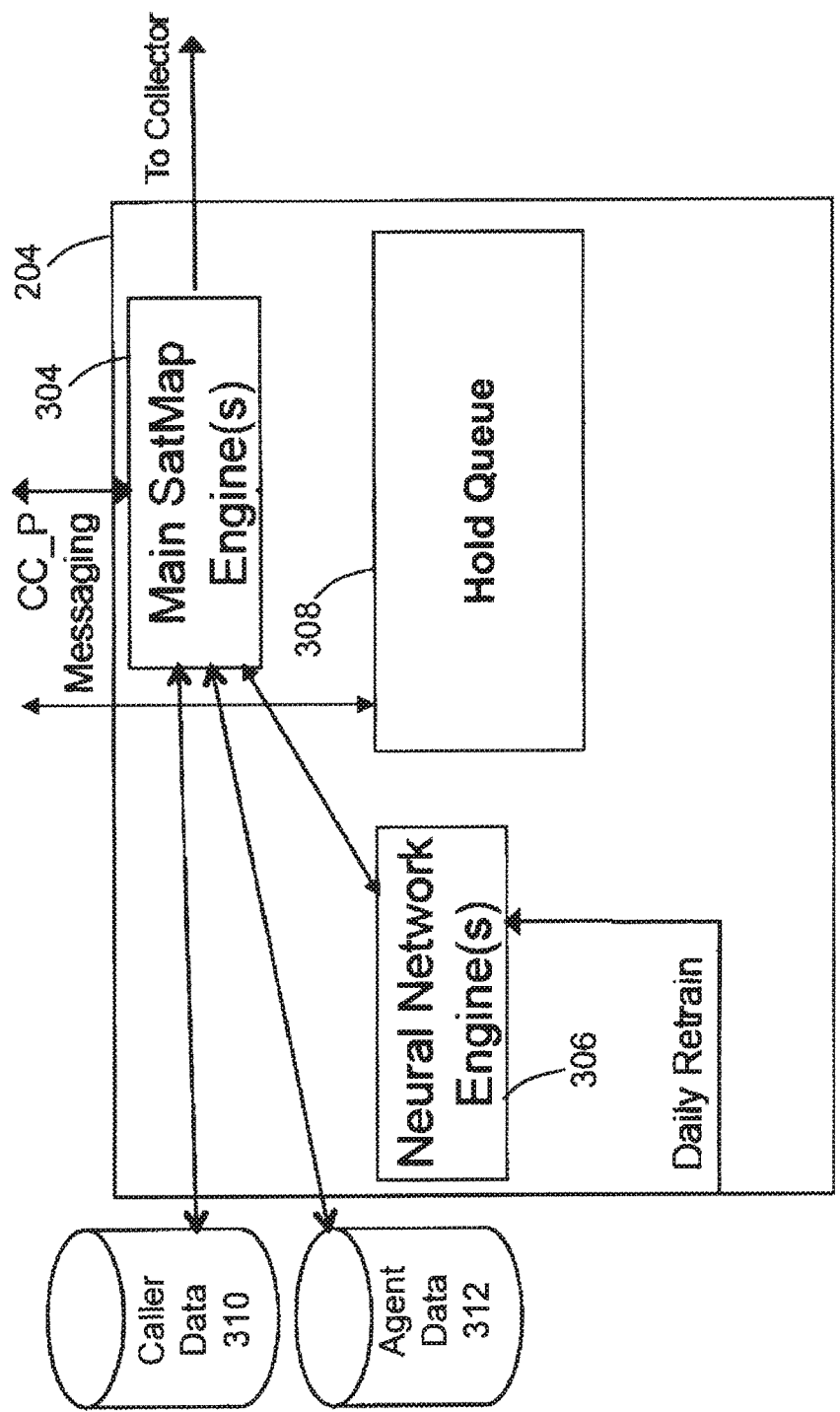
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the chances of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue 308, which may store or access hold or idle times of callers and agents, and operate to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308. In particular, mapping engine 304 mapping a first portion of callers based on one or more of performance based data, pattern matching algorithm(s), or computer model(s). Additionally, mapping engine 304 may route a second portion of callers based on a queue order of the callers, preferentially routing those callers that have been held the longest (a similar queue and preferentially routing may be used if multiple agents are available for a caller). It should be noted that other essentially random routing methods may be used in place of queue routing, and which generally serve as a control for comparing with the performance and/or pattern matching mapping methods described.

Figure 4:
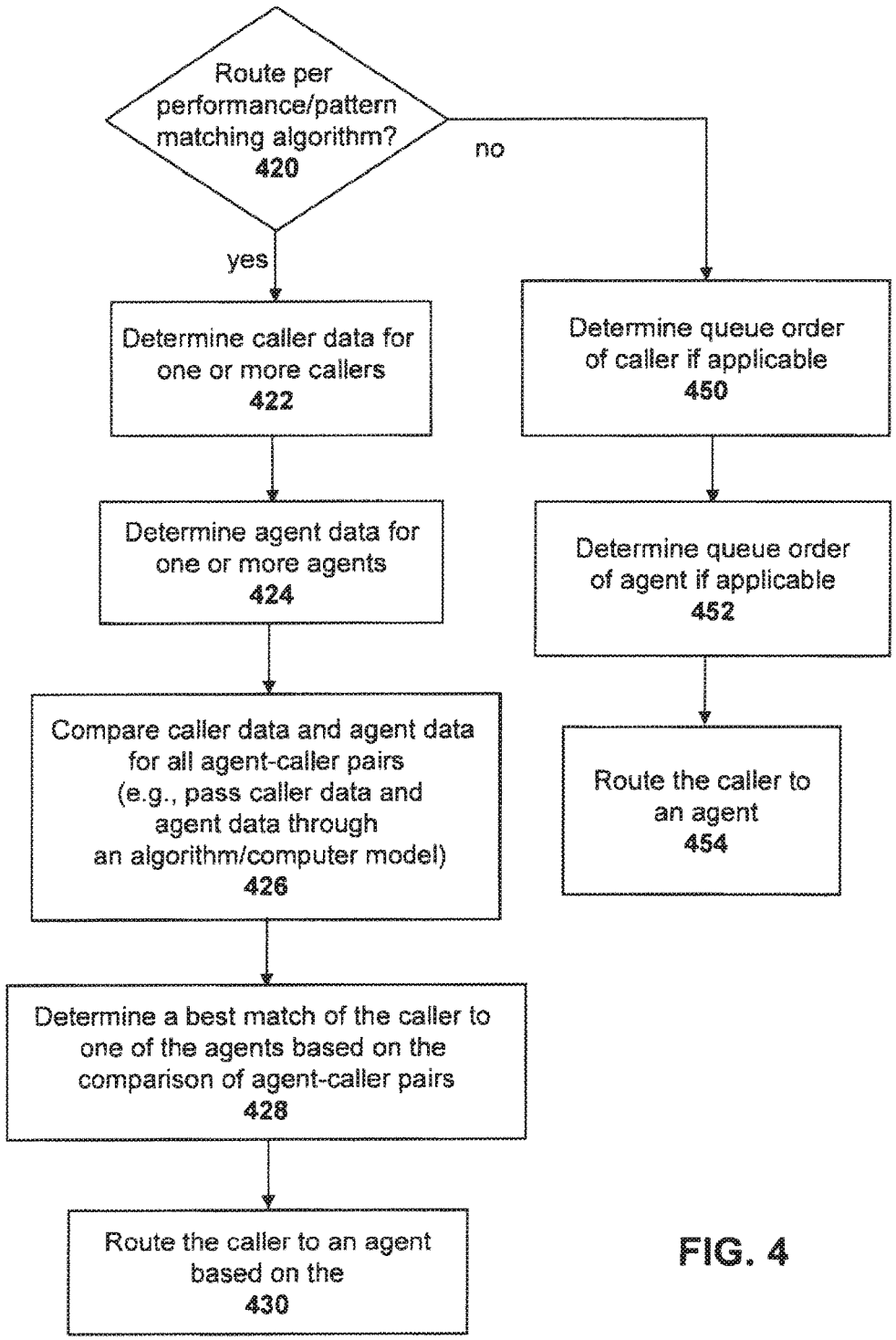
FIG. 4 illustrates an exemplary method for matching a first portion of callers and agents using caller data and agent data in a pattern matching algorithm and a second portion of callers using queue order.

FIG. 4 illustrates an exemplary method for mapping and routing callers to agents where a first portion or fraction of callers is routed based on a performance based and/or pattern matching algorithm and a second portion or fraction of callers is routed based on conventional, essentially random, routing method such as queue based routing. Accordingly, a routing system first determines how the caller is to be routed at 420. For instance, the system may map callers and agents in various ratios depending on the settings input by the contact center. For example, if the setting is at 80, or 80%, the system would map 80% of the caller-agent pairs based on performance and/or pattern matching algorithms and the remaining 20% of caller-agent pairs based on other methods such as queue order.

Exemplary performance based and/or pattern matching methods for routing callers to agents includes rating agents on performance, comparing agent data and caller data and matching per a pattern matching algorithm, creating computer models to predict outcomes of agent-caller pairs, or combinations thereof. In particular, one exemplary method for increasing the chances of an optimal interaction includes combining agent grades (which may be determined from grading or ranking agents on desired outcomes), agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, age, education, accent, income, wealth, nationality, ethnicity, area code, zip code, marital status, job status, credit score, and the like. Agent and caller psychographic data can comprise any of introversion, sociability, desire for financial success, film and television preferences, and the like.

The exemplary method may include determining caller data associated with one or more callers (e.g., a caller on hold), determining agent data associated with one or more agents (e.g., one or more available agents), comparing the agent data and the caller data (e.g., via a pattern matching algorithm), and matching the caller to an agent to increase the chance of an optimal interaction. In particular, at 422, caller data (such as a caller demographic or psychographic data) is determined or identified for a caller. One way of accomplishing this is by retrieving caller data from available databases by using the caller's contact information as an index. Available databases include, but are not limited to, those that are publicly available, those that are commercially available, or those created by a contact center or a contact center client. In an outbound contact center environment, the caller's contact information is generally known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 424, agent data for one or more agents is identified or determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser. In some example, the method uses agent grades, demographic, psychographic, and other business-relevant data, along with caller demographic, psychographic, and other business-relevant data, other embodiments of the exemplary methods and systems can eliminate one or more types or categories of caller or agent data to reduce the time to answer, computing power, or storage necessary.

The agent data and caller data may then be compared at 426. For instance, the agent data and caller data can be passed to a computational system for comparing caller data to agent data for each agent-caller pair, e.g., the caller data and agent data is compared in a pair-wise fashion for each potential routing decision. In one example, the comparison is achieved by passing the agent and caller data to a pattern matching algorithm to create a computer model that matches each caller with each agent and estimates the probable outcome of each matching along a number of optimal interactions, such as the generation of a sale, the duration of contact, or the likelihood of generating an interaction that a customer finds satisfying.

The pattern matching algorithm to be used in the exemplary methods and system can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm may create or use a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, examples can match every available agent with every available caller, or even a narrower subset of agents or callers. Likewise, embodiments of the present disclosure can match every agent that ever worked on a particular campaign—whether available or logged in or not—with every available caller. Similarly, the computer model can comprise predicted chances for one optimal interaction or a number of optimal interactions.

A computer model can also comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used in the exemplary methods and systems to determine which agents should be connected to which callers.

Based on the pattern matching algorithm and/or computer model, the method further includes determining the agent having the best match to the caller at 428. As will be understood, the best matching agent may depend on the pattern matching algorithm, computer model, and desired output variables and weightings selected by a particular call center. The caller is then routed to the best matching agent at 430.

If the caller is selected at 420 for mapping to an agent by a different method (e.g., not based on a performance and/or pattern matching algorithm), this particular exemplary method includes routing via an Automatic Call Distribution (ACD) queue order or the like by determining a queue order of the caller, if applicable, at 450. For example, if other callers are on hold waiting for an available agent, the caller may be queued with other callers, e.g., a system may order the callers in terms of hold time and preferentially map those callers that have been holding the longest. Similarly, the exemplary method includes determining a queue order of the agents, if applicable, at 452 (for example, in a situation where multiple agents are available). Accordingly, the system generally operates to map the agent that has been waiting or idle the longest with the caller that has been holding the longest. The caller may then be routed to the agent at 454.

It is noted that in other examples, where callers are matched with at least a pattern matching algorithm (e.g., alone or in combination with performance based ranking of the agents), the different method may include performance based routing. This allows for comparing or benchmarking the pattern matching algorithm against performance based routing.

According to another aspect of the exemplary systems and methods described, a visual computer interface and printable reports may be provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the number or portion of callers that are mapped via performance and/or pattern matching algorithms (as well as the weighting on an optimal interaction) can also be provided to the contact center or the contact center client, such that they can, as discussed herein, monitor the effect of the performance based data and/or pattern matching algorithms on one or more outcome variables.

Figure 5:
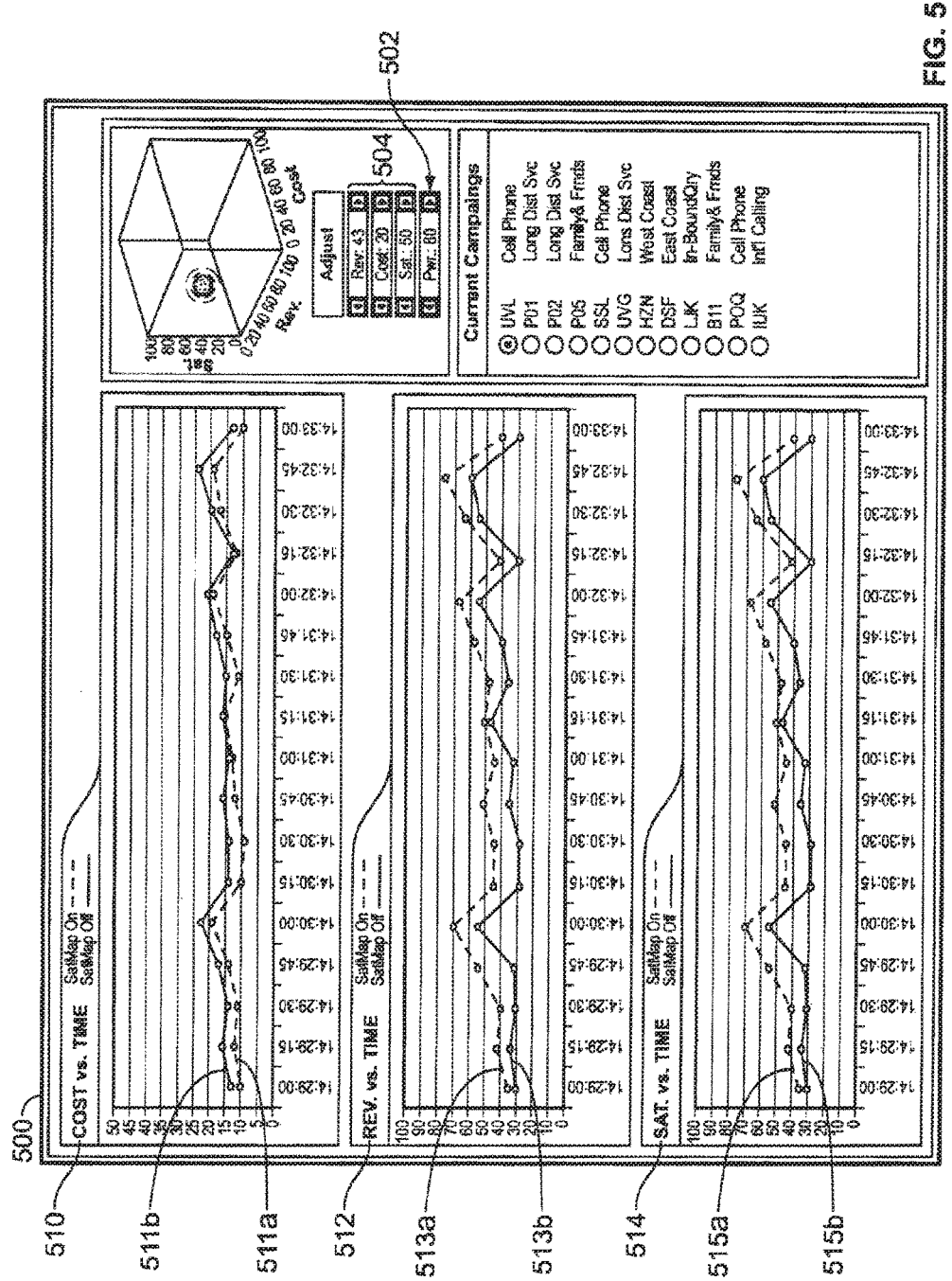
FIG. 5 illustrates an exemplary interface having a graphic element for adjusting the number or fraction of callers for routing based on performance and/or pattern matching algorithms.

FIG. 5 illustrates an exemplary interface 500 having a graphic element 502 for adjusting the fraction or portion of callers that are mapped according to performance and/or pattern matching algorithms. It will be recognized that interface 500 may be displayed within a browser page, portal page, or standalone user interface for a contact center routing system. Additionally, various other information and functionality may be included with interface 500, but is omitted here for clarity.

In this example, interface 500 displays a report of call center performance broken down by different output variables at 510, 512, and 514. In particular, cost, revenue generation, and customer satisfaction are illustrated, but other output variables such as first call resolution, cancellation, or other variable outputs from the pattern matching algorithm(s) or computer model(s) of the system may be displayed. Interface 500 further includes settings for desired weightings of different outcome variables of the pattern matching algorithms and computer models being used for routing callers to agents at 504. In particular, selector 504 includes selectors for adjusting the weighting of revenue, cost, and customer satisfaction in the call center routing algorithms and computer models. Various weighting methods and algorithms are described, for example, in copending U.S. patent application Ser. No. 12/202,091, filed Aug. 29, 2008, which is incorporated herein by reference in its entirety. Of course, various other pattern matching algorithms, computer models, and weighting methods for adjusting the desired outcomes are possible and contemplated.

Selector 502 operates to adjust the "power" of the mapping system, e.g., the portion or percentage of callers that are mapped via performance and/or pattern matching algorithms as described. In this example, if selector 502 is set to "100" the system routes all callers via the performance and/or pattern matching algorithms; alternatively, if selector 502 is set to "0" the system does not route any callers via the performance and/or pattern matching algorithms. Selector 502 may be adjusted in response to input from a mouse, input to a key board (e.g., arrow keys, numerical entries, and so on), or the like. Further, selector 502 may be replaced or further include a "slider" element, drop-down selector, entry field for manually entering numbers or values, up-and-down arrows, and so on.

As described, routing a fraction of callers by an essentially random process provides an evaluation of the performance and/or pattern matching algorithms of the mapping system. For example, outcome variables can be compared for callers routed via the mapping system and those routed otherwise. For instance, interface 500 includes a display 510 of cost over time for the routing system with the mapping system on and off (i.e., "SatMap On" and "SatMap Off") as indicated by 511*a* and 511*b* respectively. Display 510 illustrates that the cost is lower for callers routed via the mapping system than those mapped differently (e.g., by queue order or essentially randomly). As indicated in display 512, revenue for callers routed via the mapping system, shown by 513*a*, is greater than for other callers, shown by 513*b*. Further, as indicated in display 514, customer satisfaction for callers routed via the mapping system, shown by 515*a*, is greater than for other callers, shown by 515*b*. Note that in embodiments, the matching via the pattern matching algorithm may result in frequently reducing the length of time of the calls.

It is noted that the information displayed by displays 510, 512, and 514 are of past performance data; however, in other examples, interface 500 may further operate to display estimated effects on one or more outcome variables by changing selector 502. For instance, displaying the probable change in one or more of cost, revenue generation, or customer satisfaction by changing selector 502. Various estimation methods and algorithms for estimating outcome variables are described, for example, in co-pending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the pattern matching algorithm and applied to current information to estimate current performance (e.g., with respect to one or more of sales, cost, customer satisfaction, etc.). Accordingly, taking historical call data and agent information the algorithm can compute estimates of changing the power or number of callers mapped via the performance and/or pattern matching algorithms. It is noted that a comparable time (e.g., time of day, day of the week etc.) for the historical information may be important as performance will likely vary with time.

As noted, systems and methods of the present disclosure can be used to optimize the routing of callers to agents in a contact center. Examples of typical optimal interactions include increasing sales, decreasing the duration of the contact (and hence the cost to the contact center), providing for an acceptable level of customer satisfaction, or any other interaction that a contact center may seek to control or optimize.) The systems and methods of the present disclosure can improve the chance of an optimal interaction by, in general, grading agents on an optimal interaction, and matching a graded agent with a caller to increase the chance of the optimal interaction. In a more advanced embodiment, the systems and methods of the present disclosure can also be used to increase the chance of an optimal interaction by matching a caller to an agent using a computer model derived from data describing demographic, psychographic, past purchase behavior, or other business-relevant information about a caller, together with data describing demographic, psychographic, or historical performance about an agent.

As noted, in a relatively basic embodiment of the present disclosure, the performance of a contact center's agents may be collated over a period time to grade each agent on their ability to achieve an optimal interaction. The period of time can be as short as the immediately prior contact to a period extending as long as the agent's first interaction with a caller. The grade determined for the each agent is then used as a factor in matching and connecting a caller to a particular agent. For example, certain agents may be shown to have a greater ability to generate sales than that of other agents engaged in the same contact center. The embodiments of present disclosure, by preferentially routing callers to those agents shown to have greater ability to generate sales, can increase the chances of achieving greater sales during the contacts. Similarly, other agents may be shown to generate shorter interactions with callers than that of other agents at the same contact center. By preferentially routing contacts to the agents shown to generate shorter interactions with callers, a contact center or contact center client can decrease its overall need for agents and communication bandwidth, and therefore, reduce its costs.

In general, by grading the agents at a contact center on their ability to achieve an optimal interaction, the contact center can match and connect callers to agents to increase the chance of achieving any optimal interaction that may be chosen. The method of grading agent can be as simple as ranking each agent on a scale of I to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods exist.

If agents are graded on more than one optimal interaction, embodiments of the present disclosure can be configured to weight optimal interactions to ascertain which callers should be routed to which agent. For example, if there were two currently available agents for an individual caller, and an embodiment of the present disclosure estimated that routing the caller to one agent would result in a higher likelihood of a sale occurring, while routing the caller to the other agent would result in a shorter duration contact, depending on which optimal interaction the embodiment of the present disclosure was weighting more heavily, the caller may be routed to either the first or the second agent. In another example, if an embodiment of the present disclosure estimated that routing the caller to one agent would result in a high likelihood of a sale, a short contact duration, but a low level of customer satisfaction, while routing the caller to another agent would result in a high likelihood of a sale, a longer contact duration, but a higher level of customer satisfaction, depending on which mix of optimal interactions an embodiment of the present disclosure was weighting more heavily, the caller may be routed to the first or second agent.

The weightings placed on the various optimal interactions can take place in real-time in a manner controlled by the contact center, its clients, or in line with predetermined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings of embodiments of the present disclosure such that callers are routed to agents most likely to maximize their level of satisfaction. Alternatively the change in weighting may be set to take effect at a subsequent time, for instance, commencing the following morning.

In an outbound contact center environment employing telephone devices, the matching that takes place can be reflected in the form of a lead list. The lead list can be for one particular agent or a group of agents, who can then call through the lead list to conduct their solicitation efforts. Where a dialer is used to call through a lead list, upon obtaining a live caller, embodiments of the present disclosure can determine the available agents, match the live caller with one or more of the available agents, and connect the caller with one of those agents. Preferably, embodiments of the present disclosure will match the live caller with a group of agents, define an ordering of agent suitability for the caller, match the live caller to the highest-graded agent currently available in that ordering, and connect the caller to the highest-graded agent. In this manner, use of a dialer becomes more efficient in embodiments of the present disclosure, as the dialer should be able to continuously call through a lead list and obtain live callers as quickly as possible, which embodiments of the present disclosure can then match and connect to the highest graded agent currently available.

In a more advanced embodiment, the system and methods of the present disclosure can be used to increase the chances of an optimal interaction by combining agent grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, age, education, accent, income, wealth, nationality, ethnicity, area code, zip code, marital status, job status, and credit score. Agent and caller psychographic data can comprise any of introversion, sociability, desire for financial success, and film and television preferences.

Once agent data and caller data have been collected, this data is passed to a computational system. The computational system then, in turn, uses this data in a pattern matching algorithm to create a computer model that matches each agent with each caller and estimates the probable outcome of each matching along a number of optimal interactions, such as the generation of a sale, the duration of contact, or the likelihood of generating an interaction that a customer finds satisfying. As an example, embodiments of the present disclosure may indicate that, by matching a caller to a female agent, the matching will increase the probability of a sale by 4 percent, reduce the duration of a contact by 6 percent, and increase the satisfaction of the caller with the interaction by 12 percent. Generally, embodiments of the present disclosure will generate more complex predictions spanning multiple demographic and psychographic aspects of agents and callers. The embodiments of present disclosure might conclude, for instance, that a caller if connected to a single, white, male, 25 year old, agent that has high speed internet in his home and enjoys comedic films will result in a 12 percent increase in the probability of a sale, a 7 percent increase in the duration of the contact, and a 2 percent decrease in the caller's satisfaction with the contact. In parallel, embodiments of the present disclosure may also determine that the caller if connected to a married, black, female, 55 year old agent will result in a 4 percent increase in the probability of a sale, a 6 percent decrease in the duration of a contact, and a 9 percent increase in the caller's satisfaction with the contact.

It may be that the computer model indicates that a caller match with agent one will result in a high chance of a sale with but a high chance of a long contact, while a caller match with agent two will result in a low chance of a sale but a high chance of a short contact. If an optimal interaction for a sale is more heavily weighted than an optimal interaction of low cost, then the suitability scores for agent one as compared to agent two will indicate that the caller should be connected to agent one. If, on the other hand, an optimal interaction for a sale is less weighted than an optimal interaction for a low cost contact, the suitability score for agent two as compared to agent one will indicate that the caller should be connected to agent two.

One aspect of the present disclosure is that embodiments may develop affinity databases by storing data, the databases comprising data on an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

The caller affinity data can then be used to refine the matches that can be made using embodiments of the present disclosure. As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

A more advanced affinity database developed in accordance with the present disclosure is one in which a caller's contact outcomes are tracked across the various agent data. Such an analysis might indicate, for example, that the caller is most likely to be satisfied with a contact if they are matched to an agent of similar gender, age, or other characteristic of a specific agent. Using this approach, embodiments of the present disclosure could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if an embodiment of the present disclosure was to rely solely on commercial databases in order to match a caller and agent, it may predict that the caller would be best matched to an agent of the same gender to achieve optimal customer satisfaction. However, by including affinity database information developed from prior interactions with the caller, embodiments of the present disclosure might more accurately predict that the caller would be best matched to an agent of the opposite gender to achieve optimal customer satisfaction.

Another aspect of the present disclosure is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in embodiments of the present disclosure predicting that a specific agent performs best in interactions with callers of a similar age, and less well in interactions with a caller of a significantly older or younger age. Similarly this type of affinity database may result in embodiments of the present disclosure predicting that an agent with certain agent affinity data handles callers originating from a particular geography much better than the agent handles callers from other geographies. As another example, embodiments of the present disclosure may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches.

The embodiments of present disclosure can also comprise connection rules to define when or how to connect agents that are matched to a caller. The connection rules can be as simple as instructing the present disclosure to connect a caller according to the best match among all available agents with that particular caller. In this manner, caller hold time can be minimized. The connection rules can also be more involved, such as instructing embodiments of the present disclosure to connect a caller only when a minimum threshold match exists between an available agent and a caller, or to allow a defined period of time to search for a minimum matching or the best available matching at that time. The connection rules can also purposefully keep certain agents available while a search takes place for a potentially better match.

It is typical for a queue of callers on hold to form at a contact center. When a queue has formed it is desirable to minimize the hold time of each caller in order to increase the chances of obtaining customer satisfaction and decreasing the cost of the contact, which cost can be, not only a function of the contact duration, but also a function of the chance that a caller will drop the contact if the wait is too long. After matching the caller with agents, the connection rules can thus be configured to comprise an algorithm for queue jumping, whereby a favorable match of a caller on hold and an available agent will result in that caller "jumping" the queue by increasing the caller's connection priority so that the caller is passed to that agent first ahead of others in the chronologically listed queue. The queue jumping algorithm can be further configured to automatically implement a trade-off between the cost associated with keeping callers on hold against the benefit in terms of the chance of an optimal interaction taking place if the caller is jumped up the queue, and jumping callers up the queue to increase the overall chance of an optimal interaction taking place over time at an acceptable or minimum level of cost or chance of customer satisfaction. Callers can also be jumped up a queue if an affinity database indicates that an optimal interaction is particularly likely if the caller is matched with a specific agent that is already available.

Ideally, the connection rules should be configured to avoid situations where matches between a caller in a queue and all logged-in agents are likely to result in a small chance of a sale, but the cost of the contact is long and the chances of customer satisfaction slim because the caller is kept on hold for a long time while an embodiment of the present disclosure waits for the most optimal agent to become available. By identifying such a caller and jumping the caller up the queue, the contact center can avoid the situation where the overall chances of an optimal interaction (e.g., a sale) are small, but the monetary and satisfaction cost of the contact is high.

The embodiments of present disclosure may store data specific to each routed caller for subsequent analysis. For example, embodiments of the present disclosure can store data generated in any computer model, including the chances for an optimal interaction as predicted by the computer model, such as the chances of sales, contact durations, customer satisfaction, or other parameters. Such a store may include actual data for the caller connection that was made, including the agent and caller data, whether a sale occurred, the duration of the contact, and the level of customer satisfaction. Such a store may also include actual data for the agent to caller matches that were made, as well as how, which, and when matches were considered pursuant to connection rules and prior to connection to a particular agent.

This stored information may be analyzed in several ways. One possible way is to analyze the cumulative effect of embodiments of the present disclosure on an optimal interaction over different intervals of time and report that effect to the contact center or the contact center client. For example, embodiments of the present disclosure can report back as to the cumulative impact of embodiments of the present disclosure in enhancing revenues, reducing costs, increasing customer satisfaction, over five minute, one hour, one month, one year, and other time intervals, such as since the beginning of a particular client solicitation campaign. Similarly, embodiments of the present disclosure can analyze the cumulative effect of embodiments of the present disclosure in enhancing revenue, reducing costs, and increasing satisfaction over a specified number of callers, for instance 10 callers, 100 callers, 1000 callers, the total number of callers processed, or other total numbers of callers.

One method for reporting the cumulative effect of employing embodiments of the present disclosure comprises matching a caller with each agent logged in at the contact center, averaging the chances of an optimal interaction over each agent, determining which agent was connected to the caller, dividing the chance of an optimal interaction for the connected agent by the average chance, and generating a report of the result. In this manner, the effect of embodiments of the present disclosure can be reported as the predicted increase associated with routing a caller to a specific agent as opposed to randomly routing the caller to any logged-in agent. This reporting method can also be modified to compare the optimal interaction chance of a specific agent routing against the chances of an optimal interaction as averaged over all available agents or over all logged-in agents since the commencement of a particular campaign. In fact, by dividing the average chance of an optimal interaction over all unavailable agents at a specific period of time by the average chance of an optimal interaction over all available agents at that same time, a report can be generated that indicates the overall boost created by embodiments of the present disclosure to the chance of an optimal interaction at that time. Alternatively, embodiments of the present disclosure can be monitored, and reports generated, by cycling embodiments of the present disclosure on and off for a single agent or group of agents over a period of time, and measuring the actual contact results. In this manner, it can be determined what the actual, measured benefits are created by employing embodiments of the present disclosure.

As noted, embodiments of the present disclosure can include a visual computer interface and printable reports provided to the contact center or their clients to allow them to, in a real-time or a past performance basis, monitor the statistics of agent to caller matches, measure the optimal interactions that are being achieved versus the interactions predicted by the computer model, as well as any other measurements of real time or past performance using the methods described herein. A visual computer interface for changing the weighting on an optimal interaction can also be provided to the contact center or the contact center client, such that they can, as discussed herein, monitor or change the weightings in real time or at a predetermined time in the future.

Call Pattern Sensitivity:

It has been discovered that call pattern sensitivity to agent performance may be used successfully for matching calls and agents with superior results. In embodiments, call pattern performance for a given call pattern may be correlated to agent performance in an historical data set for that given call pattern and/or obtained via inference from other performance data for other call patterns. The pattern performance sensitivity correlation to agent performance may then be used in a matching algorithm. In embodiments, Spearman or Pearson correlation may be used. In embodiments the matching engine may compute an (Bayesian regression) estimate of the difference in the call pattern performance between the top performing half of agents and the bottom performing half of agents. In embodiments, the call pattern performance data for good agents, for example an average call pattern sales rate for agents in the top half of agent performance rankings can be subtracted or otherwise compared to an average call pattern sales rate for agents in the bottom half of agent performance. Thus, for example, call patterns with performance that are most highly correlated to performance of agents may, in embodiments, be matched to agents with highest performance percentiles or rankings.

In embodiments, call pattern sensitivity to agent performance may be calculated by:

1) Determining for the top half of ranked or percentiled agents in the group of agents handling this call pattern in the training data set an average underlying performance;

2) Determining for the bottom half of the ranked or percentiled agents in the group of agents handling this call pattern in the training data set an average underlying performance;

3) Subtracting the bottom half agents average underlying performance from the top half agents average underlying performance for this call pattern to obtain a performance difference number;

4) Comparing the performance difference number for this particular call pattern to a predetermined number or a sensitivity number determined on the fly; and 5) Ranking or percentiling this sensitivity number for the call patterns in the set of call patterns.

In embodiments, call pattern sensitivity to agent performance may be calculated by:

1) Estimating by Bayesian methods, the top half agents average underlying performance minus the bottom half agents average underlying performance for this particular call pattern to obtain a performance difference number;

2) Comparing the performance difference number for this particular call pattern to the performance difference number for other call patterns; and 3) Ranking or percentiling this performance difference number for the call patterns in the set of call patterns.

Note that embodiments of the disclosure are not limited to a particular algorithm to be used to determine the sensitivity. Note that the agents in the set of agents may be grouped in more than two groups. Note that another number may be used in place of or in addition to the average. Note that in embodiments, percentiles or rankings may be used for matching, or raw or modified performance data and raw or modified sensitivity ratings may be used for matching. For example, a percentile of 75 for a call sensitivity agent performance may be matched with an agent with a percentile of 75 for agent performance. Note that it is understood by one of skill in the art that this means that matching is based at least in part on rankings, or matching is based at least in part on percentiles, but both rankings and percentiles are not used at the same time.

Figure 7:
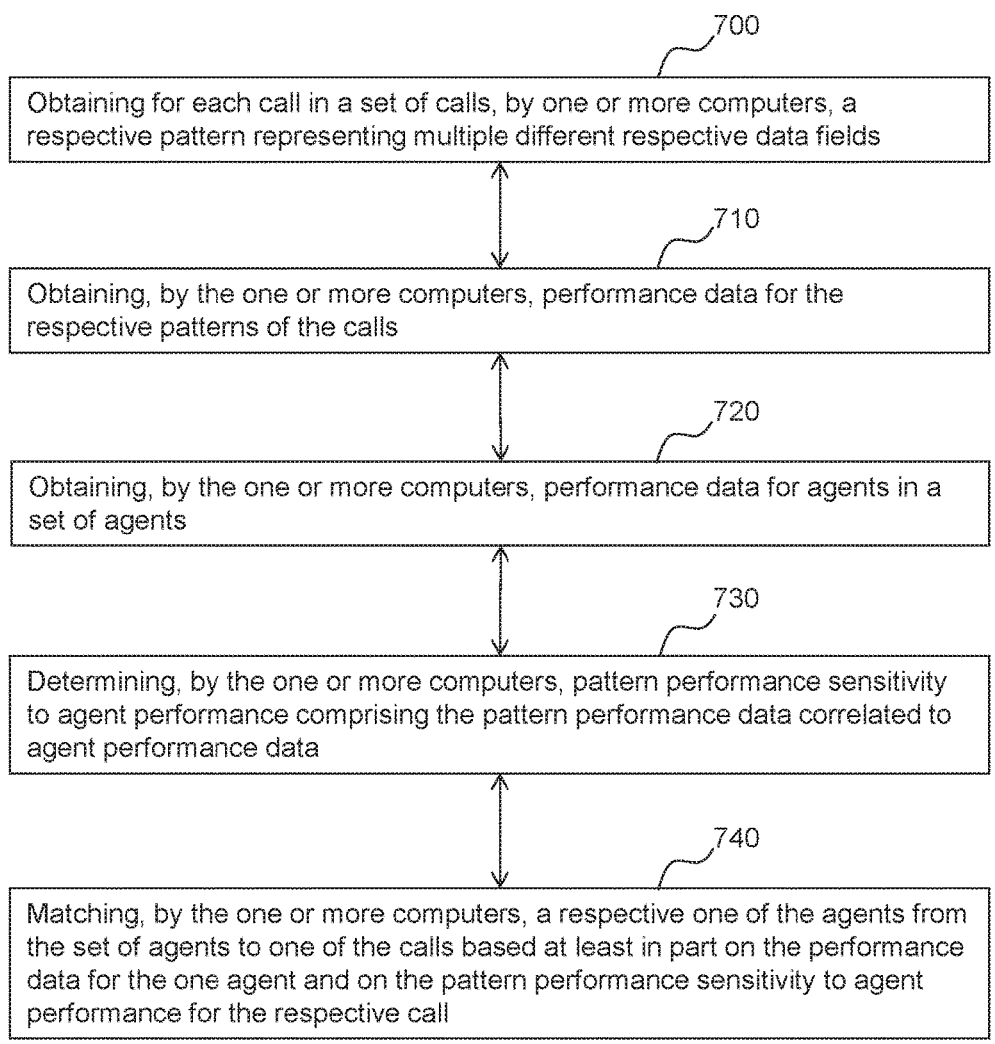
FIG. 7 is a flowchart reflecting embodiments of the present disclosure performing matching using pattern performance sensitivity to agent performance.

Referring to FIG. 7, an embodiment of a method of operating a call center system is disclosed wherein call sensitivity to agent performance is used in a matching operation. Referring to the figure, block 700 represents an operation of obtaining for each call in a set of calls, by the one or more computers, a respective pattern representing one or multiple different respective data fields. In embodiments, this operation may comprise the operation of obtaining, by one or more computers, a respective data stream for each of multiple calls, with each respective data stream having one or more different locations along the data stream representing one or more different respective fields. In embodiments, the data stream may be abstracted in whole or in part, so that the meaning for the field data in the respective different locations for the different respective fields is not known by the system. In embodiments, this operation may further comprise determining respective patterns, by the one or more computers, from respective field data positions in the respective data streams. In embodiments, these patterns may be patterns of 1's and 0's, or yes and no, or true and false, or binary, or integer only, or decimal, or other alphanumeric representations for the different fields. In embodiments, all of some of this data may comprise human interpretable field data. In embodiments, only selected positions in the data stream may be used to form the call pattern. In embodiments, all of the positions in the data stream may be used to form the call pattern. In embodiments, some of the data fields may be known, but some of the data fields may not be known. In embodiments, a data abstraction process may be performed by the present system. Embodiments incorporating abstract data are described in more detail in application Ser. No. 14/032,657 filed Sep. 20, 2013, "Use of Abstracted Data in Pattern Matching System," incorporated by reference into this application.

Block 710 represents an operation of obtaining, by the one or more computers, performance data for the respective patterns of the calls. In embodiments, this database may be obtained from the one or more databases. In embodiments, a large training data set may be obtained or accessed by a pattern matching system and used to determine correlations of the different call patterns to desired results actually obtained for these particular call patterns, e.g., a sale, retention of the caller in a program, call handle time, customer satisfaction, revenue, first call resolution, units sold, and transaction points, to name just a few. For example, it may be determined from the training data that the call pattern 100110100100 of field data correlates to low sales potential, while the call pattern 001110110100 of field data correlates to high sales potential.

In embodiments, the operation of block 710 may comprise percentiling or ranking, e.g., computing a percentile of 0 to 100 or ranking across the set, by the one or more computers, the respective patterns based at least in part on pattern performance sensitivity to agent performance, where pattern performance sensitivity is defined as pattern performance correlated to agent performance data. In other words, a determination is made relative to other of the call patterns in a set of call patterns, whether there is data in the training set indicating that the respective call pattern highly correlates with agent performance, e.g., there is high performance for most of the calls with this pattern when the agents handling the respective calls have high performance ratings, and/or low performance for most of the calls with this pattern when the agents handling the respective calls have low performance ratings. Alternatively, a low call pattern correlation with agent performance would be indicated where the call pattern performance does not seem to substantially track with the level of agent performance. Pattern performance may be inferred based at least in part on the historical data in the one or more databases for this pattern or for other patterns that correlate to this pattern.

In embodiments, instead of or in addition to determining a percentile or ranking within a set of call patterns of the respective pattern for sensitivity to agent performance, the sensitivity data/rating for the respective pattern may be compared to one or more thresholds, or may be used with or without modification.

Block 720 represents an operation of obtaining, by the one or more computers, performance data for respective of the agents in a set of agents. In embodiments, the performance may be obtained from the one or more databases. In embodiments, this operation may comprise percentiling or ranking, by the one or more computers, agents in a set of agents based at least in part on agent performance. In embodiments, these agent performance ratings may be based at least in part on historical call result data in a historical data set for the respective agent and/or may be inferred in whole or in part from demographic data or personality data for the agent as compared to other agents with similar data and their outcome results. Desired performance outcomes in the historical training data set on which agents may be rated comprise sales, retention of the caller in a program, call handle time, customer satisfaction, revenue, first call resolution, units sold, and transaction points, to name just a few. In embodiments, instead of or in addition to determining a percentile or ranking of the respective agent within a set of agents, the performance data/rating for the respective agent may be compared to one or more thresholds, or may be used with or without modification.

Block 730 represents an operation of determining, by the one or more computers, pattern performance sensitivity to agent performance comprising the pattern performance data correlated to the agent performance data. In embodiments, the determining pattern performance sensitivity to agent performance comprises performing the operation of correlating call performance data in the data set to agent performance of the agents handling the calls in a data set. In embodiment, a computation may be performed to obtain a percentile or ranking of the call performance sensitivity to agent performance within a set of calls.

Block 740 represents an operation of matching, by the one or more computers, a respective one of the agents from the set of agents to one of the calls based at least in part on the performance data for the one agent and on the pattern performance sensitivity to agent performance for the respective call. In embodiments where percentile or rankings have been obtained, the matching may be based at least in part on the percentile or ranking for the one agent from the set of agents and on the percentile or ranking by pattern performance sensitivity to agent performance for the pattern of the respective call. Alternatively, in embodiments the matching may be based at least in part on the raw or modified performance data/rating for the agent and/or the raw or modified sensitivity rating for the call pattern.

In embodiments, to avoid skewed agent utilization, agent ratings or percentiles or rankings may be weighted based at least in part on call handle time. In embodiments, the weighting may be based on average or mean handle time for the agent and/or weighted by the average number of calls handled by the agent relative to a system wide call number or the call handle time for the agent relative to a system wide call handle time number. Thus, in embodiments, the width of a given agent's domain may be weighted by the number of calls the agent handles in a given period relative to the total number of calls for available agents, or by the total or average handle time, e.g., total minutes, for the agent during the period, relative to a total estimated handle time for calls in a set of calls or an average handle time for the calls in the set of calls.

In embodiments, a weighting algorithm may comprises:
1. Agents may be ranked or percentiled in some manner in order of either performance, or sensitivity of performance to call pattern performance, average handle time, or etc.

2. A weight may then be assigned to each agent equal to either the agent's estimated percentage of total number of calls received, e.g., the call count, for a time period, or the agent's estimated percentage of call handle time relative to a total time for calls handled by the call center during the time period for which the matching is being performed, or some combination thereof. Note that in embodiments, the call count data and/or the call handle time data for the agents that are not logged in may be removed from the call center call total or the call center call handle time total.

3. For example, for percentiling, the percentile assigned to the lowest ranked agent may be one half the weight assigned in (2) above.

4. The percentile assigned to the second lowest ranked agent may be the sum of the weight assigned to the lowest agent plus one half the weight assigned to the second lowest agent.

5. The percentile assigned to the third lowest ranked agent may be the sum of the weights assigned to the two lowest agents plus one half the weight assigned to the third lowest agent.

6. Etc.

An example of this weighting based at least in part on call counts and using percentiles, for 11 agents and 1100 calls, where a $5^{th}$ agent that has taken 100 calls is not logged in would be: Lowest rated agent has taken 200 calls=20% or a weight of 20, resulting in 10 percentile. (Note that the total call center call count for the calculation is 1100−100 because the agent not logged in had 100 calls.)

$2^{nd}$ Lowest agent takes 100 calls=10% or a percentile of 20+5=25

$3^{rd}$ lowest agent takes 50 calls=5% or a percentile of 20+10+2.5=32.5.

$4^{th}$ lowest agent takes 100 calls=10% or a percentile of 20+10+5+5=40.

Etc.

Various other weighting schemes for weighting agent performance or agent sensitivity to call performance, where the weighting may be used to prevent skewing.

Another example of a weighting scheme may comprise setting the percentile for each agent evenly in increments with the increments determined based at least in part on the number of agents in the set of agents, e.g., for 10 agents, increment the percentile by 10 from agent to agent. For example, Lowest agent in performance=5 PERCENTILE
2nd lowest in performance=15 PERCENTILE
$3^{rd}$ lowest in performance=25 PERCENTILE
3rd lowest in performance=35 PERCENTILE
4rd lowest in performance=45 PERCENTILE
5rd lowest in performance=55 PERCENTILE
$6^{th}$ lowest in performance=65 PERCENTILE
Etc.

Note that the weighting examples above may be applied in embodiments to calls and call sensitivity to agent performance. Thus in embodiments, to avoid skewed call pattern utilization of resources, call pattern performance and/or call pattern performance sensitivity to agent performance ratings or percentiles or rankings may be weighted based at least in part on call count for calls for the given pattern relative to a system wide call number or estimated call handle time for calls with this pattern relative to a system wide handle time number. In embodiments, the weighting may be based on average or mean handle time for the call pattern and/or weighted by the average number of calls with this pattern relative to a total number of calls in the set of calls (e.g., calls in the system at that time or in a given period) or relative to an average number of calls for the system. In embodiments, the weighting may be by the estimated call handle time for the call pattern relative to an estimated total call handle time for calls in the set of calls or an average call handle time for calls in the set of calls. Thus, in embodiments, the width of a given call pattern's domain may be weighted by the number of calls with this pattern in a given period relative to the total number of calls in the set of calls, or by the total or average handle time for calls with this pattern, e.g., total minutes during the period, relative to a total estimated handle time for calls in the set of calls or an average handle time for the calls in the set of calls.

Thus in embodiments, the weighting of percentiles or rankings may be based at least in part on a call count for each of the patterns in a set of calls relative to a total number of calls in the call set or an average number of calls per pattern in the call set. Likewise, weighting may be based at least in part on weighting by an estimated call handle time for the call relative to a total call handle time or an average call handle time for calls in the set of calls.

Likewise, in embodiments the percentiles or rankings of call performances and/or call pattern sensitivity may be weighted evenly in increments, with the increments determined based at least in part on the number of calls in the call set.

Accordingly, in embodiments the method may further comprise the operation of weighting, by the one or more computers, the ranking or percentile of agent performance and/or weighting call performance and/or call sensitivity to agent performance by one or more parameters.

In embodiments where the weighting is of agent performance, the weighting may be based at least in part on a call count for the respective agent relative to a total or adjusted call count for the call center during a period. Alternatively or in addition, the weighting may be based at least in part on a call handle time total or an average handle time for the respective agent relative to a total or adjusted call handle time for the call center during a period.

In embodiments where the weighting is of call performance, the weighting may be based at least in part on an estimated call handle time for the respective call relative to the call handle times for the set of calls.

Note that embodiments of the disclosure may comprise weighting agent performance and/or call performance in a matching scheme where call sensitivity to agent performance or agent sensitivity to call performance are not used in the matching algorithm. For example, the matching algorithm may comprise matching the weighted rankings or percentiles of agents to either the rankings or percentiles of the calls in a set of calls or to the weighted rankings or percentiles of the calls. In other embodiments, the matching algorithm may comprise matching the weighted rankings or percentiles of calls to the rankings or percentiles of the agents in a set of agents or to the weighted rankings or percentiles of the agents.

In embodiments, this weighting allows a distribution of the load. Note that agent sensitivity to call performance may be weighted in the same manner. As noted, alternatively or in addition, the weighting may be based on one or more other parameters, such as call handle time. In embodiments, edge correction weighting may also be applied, as disclosed in application Ser. No. 13/843,724 filed on Mar. 15, 2013 and Ser. No. 13/843,541 filed on Mar. 15, 2013.

Figure 11:
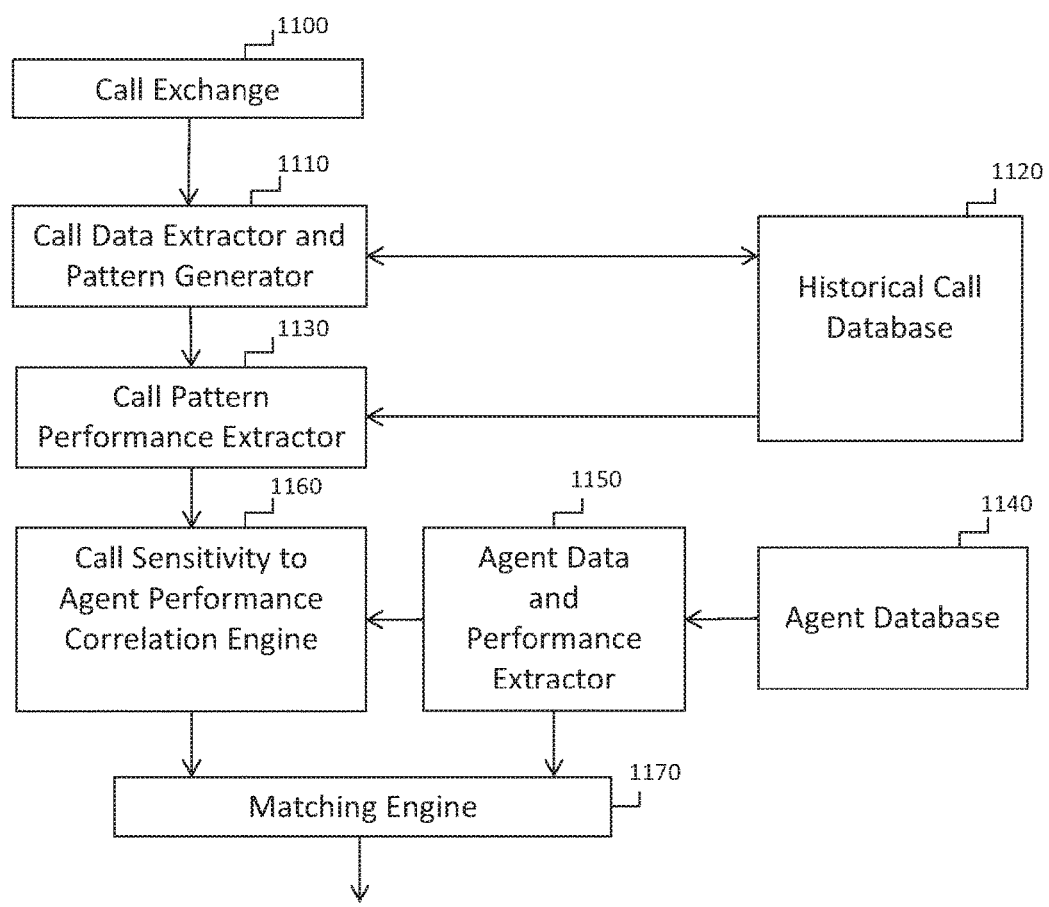
FIG. 11 is a system embodiment for implementing embodiments described herein based at least in part on call pattern sensitivity to agent performance.

In embodiments, matching based at least in part on call sensitivity to agent performance may be implemented using a system as shown in FIG. 11. Referring to the figure, calls are obtained, e.g., either received or generated in a call exchange component 1100. A call data extractor and pattern generator 1110 may be used to extract call data from a historical call database 1120 to obtain a call pattern comprising one or more data fields of call data. The historical call database 1120 may include demographic data and/or psychographic data for the caller, skill requirements for previous calls, and outcomes of previous calls, to name a few of the items that may be available. This component may also extract call data from other databases and/or generate call data on the fly based on the call number or other call data.

A call pattern performance extractor component 1130 may be connected to receive the call pattern from the block 1110 to obtain performance data for the respective call pattern from an historical call database, or to infer it from similar call patterns. In embodiments, the call performance extractor component 1130 may also perform a percentile or ranking operation to compute a percentile from 0-100 or to rank the pattern performance of the call against other calls in a set of calls.

Likewise, an agent data and performance extractor component 1150 may be connected to extract data from an agent database 1140 that contains demographic data and/or psychographic data and skill data and performance data for agents. In embodiments, the extractor component 1150 may be configured to obtain agent data for agents in a set of agents, e.g., agents that are currently available, or agents that are currently available or are soon to be available, or any other convenient set of agents selected based at least in part on one or more criteria, e.g., such as skill and/or call handle time, to name a few. In embodiments, the component 1150 may perform a percentile or ranking operation relative to agents to compute a percentile or ranking within a set of agents based at least in part on performance data for the agents.

In embodiments, a call sensitivity to agent performance correlation engine 1160 may receive inputs from the call pattern performance extractor 1130 and from the agent data and performance extractor component 1150. The correlation engine 1160 may perform the correlation of the performance for a selected call pattern to agent performance for agents that handled this call pattern in the past. In embodiments, the calls in a set of calls may be percentiled or ranked by call sensitivity to agent performance.

In embodiments, a matching engine 1170 performs matching of the given call to an agent based as at least in part by selecting an agent based at least in part on the agent performance data and based at least in part on the call pattern sensitivity to agent performance. The particular matching may be high call pattern sensitivity matched to agents with high performance data, or any other matching criteria that may factor in other data elements such as skill, handle time, call type, etc. In embodiments, the matching may be based at least in part on matching percentiles or rankings of the call pattern sensitivity within the set of calls and the agent performance within the set of agents.

In embodiments, a switching between or among algorithms has been discovered to be advantageous. In some embodiments, this is due to second order effects from estimating differentials in call pattern performance between good performance calls and bad performance calls and/or differential noise effects from estimating differentials in agent performance between good agent performance and bad agent performance.

In embodiments, the calls in a set of calls may be grouped into two or more groups based on one or more criteria. In embodiments, one of the groups may be matched using a first algorithm, and a different group may be matched using a second algorithm.

In embodiments, the groupings may be based at least in part on respective estimated performances of the patterns for a set of calls. In embodiments, the call patterns may be percentiled or ranked by pattern performance, and then grouped by their percentiles or rankings into two or more groups, comprising one group with percentiles or rankings in one range of percentiles or rankings, and at least a different group that has percentiles or rankings in a higher range relative to the one group, e.g., at least a top group and a bottom group, or a top group and a middle group and a low group, etc. The number of groupings is not limiting on embodiments of the present disclosure. Note that the grouping do not have to have equal numbers in each group. For example, 25% of the call patterns could be in the low group, and 75% of the call patterns could be in the higher group, or vice versa. Other examples, would be 50-50 groupings where two groups are used, or any other grouping ratio. The percentages of the call set in the groups is not limiting on embodiments of the present disclosure and may be determined based on one or more criteria. For example, the ratio of calls in the groups may be determined empirically, and/or may be based at least in part on historical data in the one or more databases. Alternatively, in embodiments the ratios may be based at least in part on different ranges of raw or modified pattern performance data, and/or based on data availability or any other criteria.

In embodiments, call patterns in the lowest group of performance percentiles or rankings may be matched using the first algorithm, while calls in the different group of performance percentiles or rankings may be matched using the second algorithm. For example, in embodiments call patterns in the lowest group may be matched using an algorithm that matches based at least in part on percentiles or rankings of call pattern performance to agent percentiles or ranking by performance. In this embodiment, call performance percentiles or rankings in the low performance group may be matched with agents with low performance percentiles or rankings. Alternatively, calls in this low call pattern performance group may be matched with agents with higher performance percentiles or rankings.

In embodiments, call patterns in a higher group of performance percentiles or rankings may be matched using a different algorithm that matches based at least in part on call pattern sensitivity to agent performance and agent performance. For example, calls in this higher group of call patterns may be matched so that agents with higher performance percentiles or rankings are matched with call pattern percentiles or rankings that are more highly influenced by good agent performance.

Thus, in embodiments, for this higher performance group of call patterns, instead of matching calls with the highest performance percentiles or rankings with agents with the highest performance percentiles or rankings, matching is performed by determining a respective call pattern's sensitivity to agent performance, e.g., percentiles or rankings of calls is made based at least in part on a correlation between the call pattern performance and agent performance. Thus, high performance agents are not wasted on call patterns where agent performance has a low influence on the outcome for the call. These high performance agents are instead matched with call patterns where agent performance is expected to have a strong influence. In essence, the high performing agents are reserved (to prevent over-use) and matched to call patterns where they will be most useful. This operation reduces a situation where a good agent is not available for a call pattern that is highly influencable by agent performance. Poorly ranked agents are matched where their low performance percentile or ranking will have the least adverse effect.

More generically, in other embodiments, a group of calls that are similar in one or more aspects, may be grouped, and one algorithm may be used with this group, and a different algorithm may be used with a different group having different characteristics. For example, one algorithm may be used where the system has a lot of current data for a pattern. A different algorithm may be used where there is not a lot of data for the pattern in the system. Thus, to facilitate this operation using multiple algorithms, the patterns may be grouped in multiple groups based on different amount ranges of current data for the respective patterns. Alternatively or in addition, in embodiments grouping may be based at least in part on percentiles or rankings or ratings of the skills needed by the calls, and/or on the proficiency of the agents for a given skill. In such embodiments, the groupings may be low range and higher range groups of skill proficiency, or a low range, medium range, and high range skill proficiency, or any other number of groups based on skill proficiency ranges. Different matching algorithms may be used for the different groups. Alternatively or in addition, in embodiments grouping may be based at least in part on agent call handle time, or on estimated call handle time for a given call pattern. In such embodiments, the groupings may be low range and higher range groups of agent call handle time or pattern call handle time, or low range, medium range, and high range groups of agent call handle time or pattern call handle time, or any number of groups based on agent call handle time or pattern call handle time ranges. As noted, different matching algorithms may be used for the different groups. Thus, a variety of different groupings are contemplated. In embodiments, a cutoff or breakpoint between the different groups may be determined empirically or using one or more criteria.

In embodiments, a criterion for the cutoff or breakpoint between the groups may be a statistical criterion based on confidence interval estimates. For example, if the data supporting performance determination in the historical or other databases is substantial while the data supporting call sensitivity correlation to agent performance is not substantial for the call patterns in the set of calls, then the breakpoint may be skewed so that more of the calls are handled in a group that matches based on call performance and agent performance. Likewise, if the data supporting performance determination in the historical or other databases is not substantial while the data supporting call sensitivity correlations to agent performance is substantial for the call patterns in the set of calls, then the breakpoint may be skewed so that more of the calls are handled in a group that matches based on call sensitivity to agent performance and agent performance.

Figure 8B:
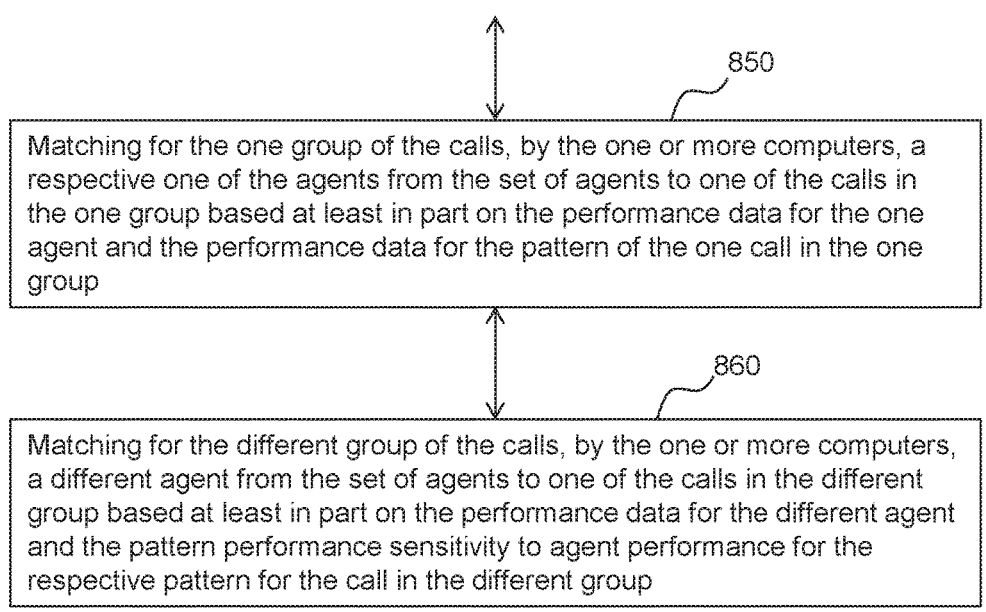
FIG. 8B is a continuation of the Flowchart of FIG. 8A.

Referring to FIG. 8, embodiments using two different matching algorithms are disclosed wherein at least one of the algorithms uses call pattern sensitivity to agent performance. Block 800 represents an operation of obtaining, by the one or more computers, for each call in one set of calls, a respective pattern representing one or multiple different respective data fields.

In embodiments, this operation may comprise an operation of obtaining a respective data stream for each of multiple calls, with each respective data stream having one or more different locations along the data stream representing one or more different respective fields. In embodiments, the data stream may be abstracted in whole or in part, so that the meaning for the field data in the respective different locations is not known by the system. The operation may further comprise determining respective patterns, by the one or more computers, from respective field data positions in the respective data streams. In embodiments, these patterns may be patterns of 1's and 0's, or yes and no, or true and false, or binary, or integer only, or decimal, or other alphanumeric representations for the different fields. In embodiments, all or some of this data may comprise human interpretable field data. In embodiments, all of the positions in the data stream are used to form the respective pattern. In embodiments, only selected positions in the data stream are used to form the respective pattern.

Block 810 represents an operation of obtaining, by the one or more computers, performance data for the respective patterns of the calls. In embodiments, this data may be obtained from the one or more databases. In embodiments, this operation may comprise percentiling or ranking, by the one or more computers, the respective patterns of the calls based at least in part on pattern performance for the respective patterns. Pattern performance for one or more desired outcomes may be inferred based at least in part on the historical data in the one or more databases, e.g., training data, for this pattern or for other patterns that correlate to this pattern. As noted above, in embodiments, instead of or in addition to determining a percentile or ranking of the respective pattern within a set of call patterns, the performance data/rating for the respective call pattern may be compared to one or more thresholds, or may be used with or without modification.

Block 820 represents an operation of obtaining, by the one or more computers, performance data for respective of the agents in a set of agents. In embodiments, the performance may be obtained from the one or more databases. In embodiments, this operation may comprise percentiling or ranking, by the one or more computers, agents in a set of agents based at least in part on agent performance.

Block 830 represents an operation of determining, by the one or more computers, pattern performance sensitivity to agent performance comprising the pattern performance data correlated to agent performance data. In embodiments, the determining pattern performance sensitivity to agent performance operation may comprise the step of correlating call performance data in the data set to agent performance of the agents handling the calls in the data set. In embodiments, a further operation may be performed of percentiling or ranking, by the one or more computers, the respective patterns of the calls based at least in part on their respective pattern performance sensitivity to agent performance. Desired performance outcomes in the training data set on which patterns may be rated comprise sales, retention of the caller in a program, call handle time, customer satisfaction, revenue, first call resolution, units sold, and transaction points, to name just a few. In embodiments, instead of or in addition to determining a percentile or ranking within a set of call patterns of the respective pattern for sensitivity to agent performance, the sensitivity data/rating for the respective pattern may be compared to one or more thresholds, or may be used with or without modification.

Block 830 represents an operation of obtaining, by the one or more computers, performance data for agents in a set of agents. As noted, in embodiments this data may be obtained from the one or more databases. In embodiments, this operation may comprise percentiling or ranking, by the one or more computers, agents in a set of agents based at least in part on agent performance. In embodiments, these agent performance ratings may be based at least in part on historical call result data for the respective agent and/or may be inferred in whole or in part from demographic data or personality data for the agent and other agents with similar data and their outcome results. Desired performance outcomes in the training data set on which agents may be rated comprise sales, retention of the caller in a program, call handle time, customer satisfaction, revenue, first call resolution, units sold, and transaction points, to name just a few. As noted above, in embodiments, instead or in addition to determining a percentile or ranking of the respective agent within a set of agent, the performance data/rating for the respective agent may be compared to one or more thresholds, or may be used with or without modification.

Block 840 represents an operation of grouping, by the one or more computers, the patterns for the one set of calls into at least two groups comprising one group and different group based one or more criteria. In embodiments, the grouping may be based at least in part on performance data for the respective patterns. In embodiments, the grouping may be based at least in part on the performance percentiles or rankings of the call patterns within the set of calls, with the call patterns in one of the groups having a lower percentiles or ranking range than call patterns in the different group. In embodiments, there may be two groups, e.g., a low performance range group and a high performance range group, or three groups, or four groups, or more. Alternatively, the groupings may be based at least in part on different ranges of raw or modified pattern performance data. The number of groups is not limiting on embodiments of the present disclosure. Ratio examples where two groups are used would be grouping ratios of 25-75, and 50-50, 75-25, or any other grouping ratio. The percentages of the call set in the respective groups is not limiting on embodiments of the present disclosure and may be determined based on one or more criteria. For example, the ratio of calls in the groups may be determined empirically, and/or may be based at least in part on historical data in the one or more databases and/or on the availability of data for the parameter, and/or other parameters.

In other embodiments, the groupings may be based at least in part on agent performance ranges. In other embodiments, the groupings may be based at least in part on data volume ranges for the respective call patterns, e.g., how much data is available in the training data set for the respective call patterns.

Block 850 represents an operation of matching for the one group of the calls, by the one or more computers, a respective one of the agents from the set of agents to one of the calls in the one group using a first algorithm. In embodiments, the first algorithm for matching of a respective one of the agents from the set of agents to one of the calls in the one group may be based at least in part on the performance data for the one agent and the performance data for the pattern of the one call in the one group. In embodiments, the matching of the one group of calls may be based at least in part on the agent percentile or ranking by performance of the respective one agent and the call percentile or ranking by performance of the respective pattern for the one call in the one group. For example, the matching step for the one group may comprise matching call patterns in a low percentile or ranking group based at least in part on the percentiles or rankings for the agents and the percentiles or rankings by performance data for the respective call patterns in the one group. Alternatively, the groups and the matching may be reversed. As noted, in embodiments, the matching may instead or in addition be based at least in part on the raw or modified performance data/ratings for the agent and/or the call pattern.

Block 860 represents an operation of matching for the different group of the calls, by the one or more computers, a different agent from the set of agents to one of the calls in the different group using a second algorithm. In embodiments, the matching of a different agent from the set of agents to one of the calls in the different group may be based at least in part on the performance data for the different agent and the pattern performance sensitivity to agent performance for the respective pattern for the call in the different group. In embodiments, the matching for the different group of the calls may be based at least in part on the agent percentile or ranking by the performance of the respective different agent and the call percentile or ranking by pattern performance sensitivity to agent performance for the respective pattern for the call in the different group. Thus, in embodiments, the matching step for the different group may comprise matching call patterns in a higher percentile or ranking group based at least in part on percentiles or rankings by performance for the agents and percentiles or rankings by pattern performance sensitivity to agent performance in this different group. Alternatively, the groups and the matching may be reversed. In embodiments, the matching may be based at least in part on the raw or modified performance data/ratings for the agents and/or the raw or modified sensitivity rating for the call pattern.

In embodiments, these matching steps may be performed concurrently. In embodiments, the matching steps may be performed consecutively or may have overlapping performance. In embodiments, a percentile or ranking breakpoint between the one group and the different group may be determined based on one or more criteria. As noted, one criterion may be to determine the percentile or ranking cutoff point empirically, and/or may be based at least in part on historical performance data in the one or more databases for various percentile or ranking cutoff points or based at least in part on a level of data availability for the agent or the call pattern, or one or more other criteria.

As noted, in embodiments a criterion for the cutoff or breakpoint between the groups may be a statistical criterion based on confidence interval estimates. For example, if the data supporting performance determination in the historical or other databases is substantial while the data supporting the agent sensitivity to call performance correlation is not substantial for the agents in the set of agents, then the breakpoint may be skewed so that more of the agents are assigned to a group that matches based on call performance and agent performance. Likewise, if the data supporting performance determination in the historical or other databases is not substantial while the data the supporting agent sensitivity to call performance correlation is substantial for the agents in the set of agents, then the breakpoint may be skewed so that more of the agents are in a group that matches based on agent sensitivity to call performance and call performance.

In embodiments, a further operation may be performed of matching, by the one or more computers, a different set of calls to agents using a different matching algorithm. For example, the different algorithm may be a random matching based at least in part on call position in a queue or length of time of a call in a pool of callers. The further operation may then be performed of comparing performance data from call-agent matches of the different set of calls using the different matching algorithm with performance data for the one set of calls using a combination of the matching using the first algorithm of the one group of call patterns to agents and the matching using the second algorithm of the different group of call patterns to agents. In embodiments, an operation may also be performed of generating, by the one or more computers, a report or display data for the performance comparing results from using the combination of matching algorithms against performance using the different matching algorithm.

Figure 12:
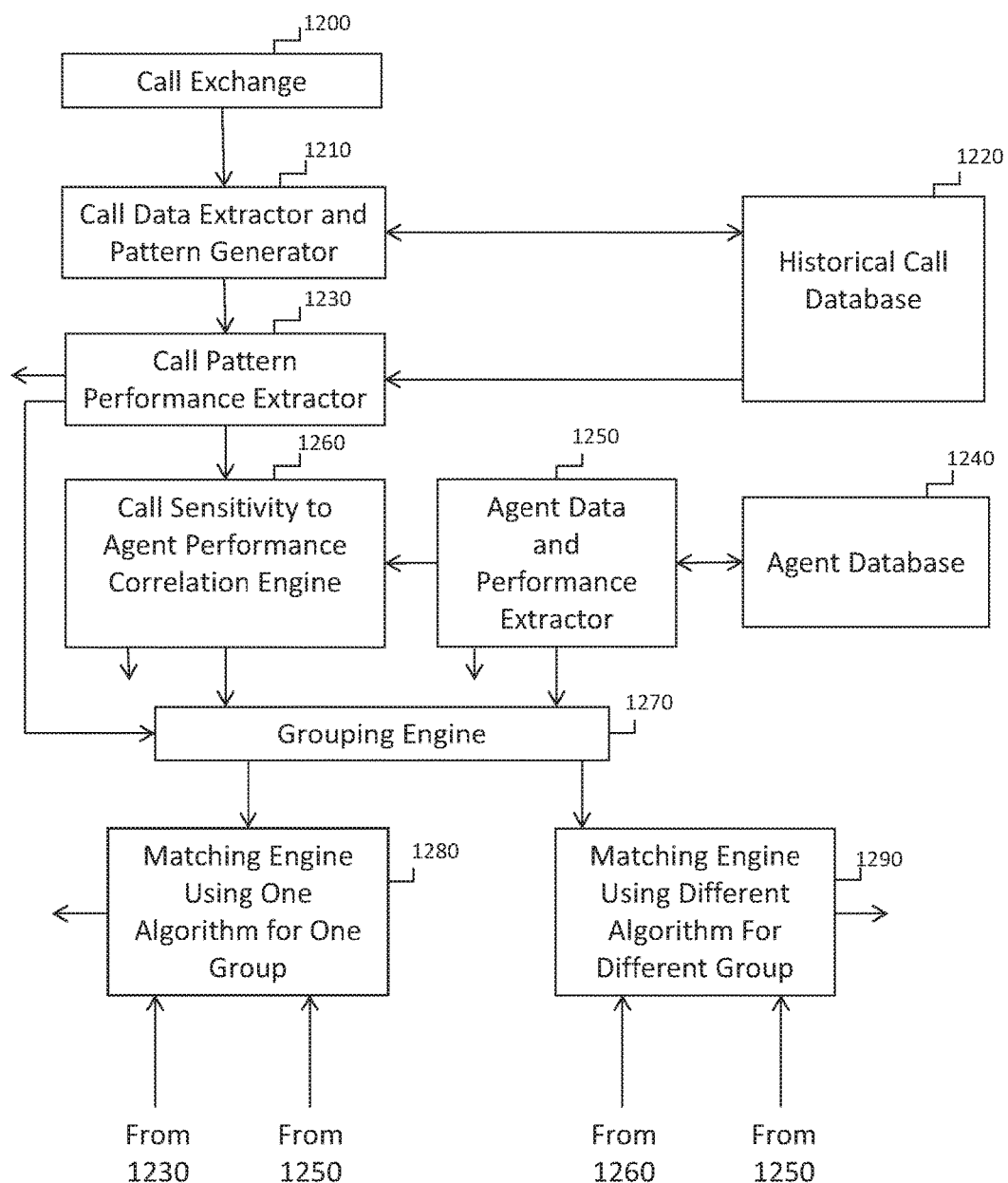
FIG. 12 is a system embodiment for implementing embodiments described herein based at least in part on groupings using multiple matching algorithms and call pattern sensitivity to agent performance.

In embodiments, matching based at least in part on switching between two or more matching algorithms that use grouping and are based at least in part on call sensitivity to agent performance may be implemented using a system as shown in FIG. 12. Referring to the figure, calls are obtained, e.g., either received or generated in a call exchange component 1200. A call data extractor and pattern generator 1210 may be used to extract call data from a historical call database 1220 to obtain a call pattern comprising one or more data fields of call data. The historical call database 1220 may include demographic data and/or psychographic data for the caller, skill requirements for this or previous calls, and outcomes of previous calls, to name a few of the items that may be available. This component may also extract call data from other databases and/or generate call data on the fly based on the call number or other call data.

A call pattern performance extractor component 1230 may be connected to receive the call pattern from the block 1210 and to obtain performance data for the respective call pattern from the historical call database 1220 or to infer it from similar call patterns. In embodiments, the call performance extractor component 1230 may also perform a percentile or ranking operation to compute a percentile or to rank the pattern performance for the call against other calls in a set of calls.

Likewise, an agent data and performance extractor component 1250 may be connected to extract data from an agent database 1240 that contains demographic data and/or psychographic data and skill data and performance data for agents. In embodiments, the agent data and performance extractor component 1250 may be configured to obtain agent data for agents in a set of agents, e.g., agents that are currently available, or agents that are currently available or are soon to be available, or any other convenient set of agents selected based at least in part on one or more criteria such as skill and/or call handle time, to name a few. In embodiments, the agent data and performance extractor component 1250 may perform a percentile or ranking operation to compute a percentile or rank the agents within a set of agents based at least in part on performance data for the agents.

In embodiments, a call sensitivity to agent performance correlation engine 1260 may receive inputs from the call pattern performance extractor 1230 and from the agent data and performance extractor component 1250, and generate a correlation of the performance for a selected call pattern to agent performance for agents that handled this call pattern in the past. In embodiments, a computation may be performed to percentile or rank the calls in a set of calls by call sensitivity to agent performance.

In embodiments, a grouping engine 1270 may be provided to group the calls or the agents into two or more groups based on one or more criteria. In embodiments, the grouping may be based at least in part on call performance ranges, as previously described. In other embodiments, the groupings may be based at least in part on volume ranges of data for the patterns, ranges of call handle time, skill level ranges, agent performance ranges, to name a few. The grouping engine 1270 is shown in the figure as receiving inputs from any of blocks 1230, 1250, 1260, and/or potentially may also receive an input from block 1210, depending on the one of more parameters used for the grouping.

In embodiments, a matching engine 1280 using one algorithm may be used for one group of calls. The one algorithm may be configured for matching one of the agents from the set of agents to one of the calls in the one group based at least in part on the performance data for the one agent and the performance data for the pattern of the one call in the one group. In embodiments, the matching may be based at least in part on matching percentiles or rankings of the call pattern performance within the set of calls and the percentiles or rankings of the agent performance within the one group of agents. Block 1280 illustrates an embodiment where inputs are taken from blocks 1230 and 1250.

In embodiments, a matching engine 1290 using a different algorithm may be used for calls in a different group of the calls. The matching engine 1290 may be configured for matching a different agent to one of the calls in the different group of calls based at least in part on the agent performance data for the different agent and based at least in part on the call pattern sensitivity to agent performance for the respective pattern for the call in the different group. The particular matching may be high call pattern sensitivity matched to agents with high performance data, or any other matching criteria that may factor in other data elements such as skill, handle time, call type, etc. In embodiments, the matching for this different group may be based at least in part on matching percentiles or rankings of the call pattern sensitivity within the set of calls and the agent performance within the set of agents. Block 1290 illustrates an embodiment where inputs are taken from blocks 1260 and 1250.

Agent Sensitivity to Call Performance:

For some agents, it has been discovered that there is a dramatic correlation of their agent performance to call performance. In some agents, there is minimal correlation. The agent sensitivity to call performance correlation may be used in a matching algorithm. Thus, for example, agents with performance that highly correlates to performance of call patterns may be matched to call patterns with a high performance percentiles or rankings. Note that instead of percentiles or rankings, raw or modified performance data and/or raw or modified agent sensitivity ratings may be used for matching.

Figure 9:
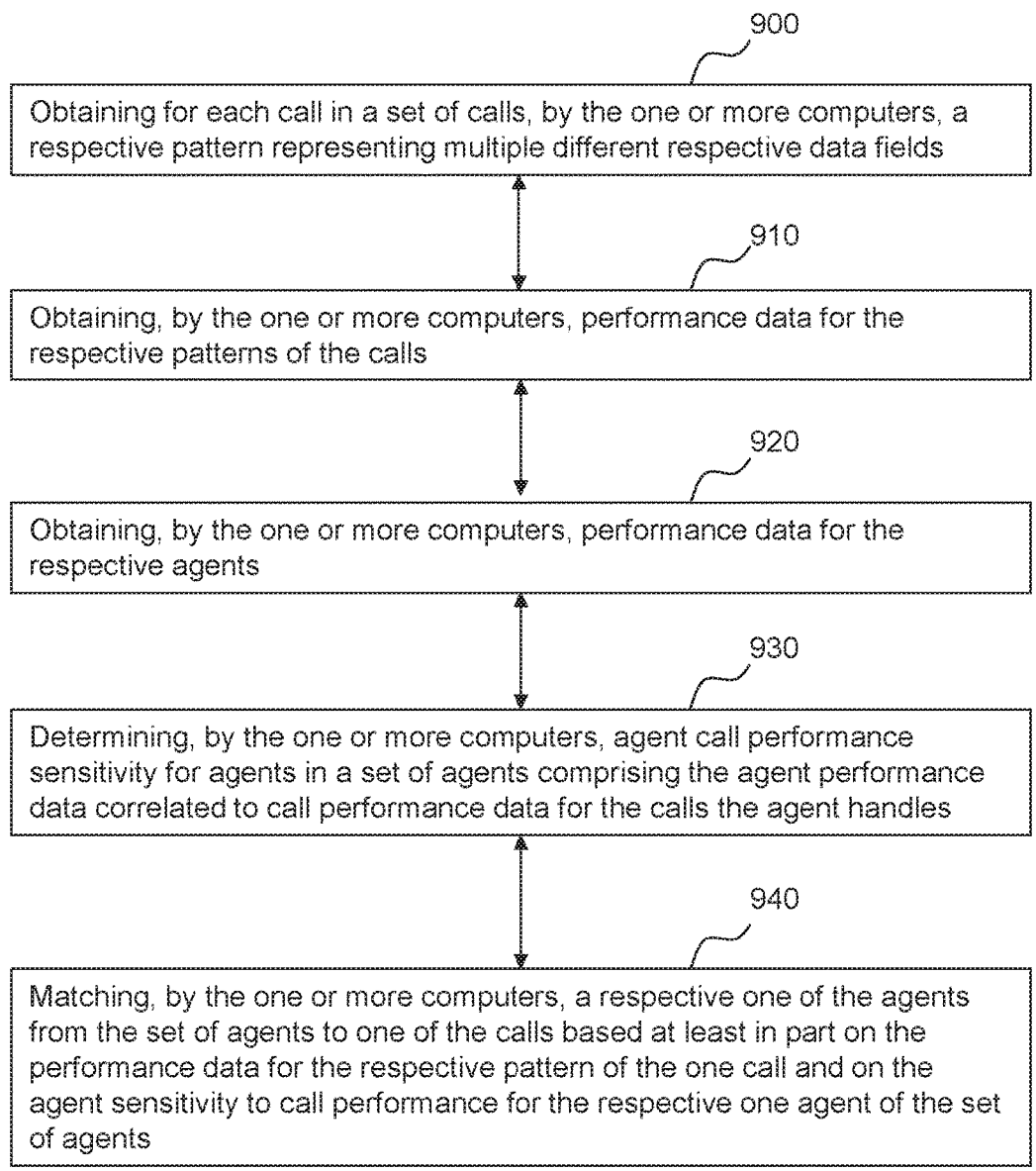
FIG. 9 is a flowchart reflecting embodiments of the present disclosure for performing matching using agent sensitivity to call performance.

Referring to FIG. 9, embodiments are disclosed for a method of operating a call center system with matching based at least in part on agent sensitivity to call performance. Referring to the figure, block 900 represents an operation of obtaining for each call in a set of calls, by the one or more computers, a respective pattern representing one or multiple different respective data fields. In embodiments, this operation may comprise obtaining, by the one or more computers, a respective data stream for each of multiple calls, with each respective data stream having one or more different locations along the data stream representing one or more different respective fields. In embodiments, the data stream may be abstracted in whole or in part, so that the meaning for the field data in the respective different locations for the different respective fields is not known by the system. The operation may further comprise determining respective patterns, by the one or more computers, from respective field data positions in the respective data streams. In embodiments, these patterns may be patterns of 1's and 0's, or yes and no, or true and false, or binary, or integer only, or decimal, or other alphanumeric representations for the different fields. In embodiments, all or some of this data may comprise human interpretable field data. In embodiments, all of the positions in the data stream are used to form the respective pattern. In embodiments, only selected positions in the data stream are used to form the respective pattern.

Block 910 represents an operation of obtaining, by the one or more computers, performance data for the respective patterns of the calls. In embodiments, this data may be obtained from the one or more databases. In embodiments, this step may comprise percentiling or ranking, e.g., computing a percentile from 0 to 100 or ranking, by the one or more computers, the respective patterns of the calls in the set of calls based at least in part on pattern performance for the respective patterns. Pattern performance for one or more desired outcomes may be inferred based at least in part on the historical data in the one or more databases for this pattern or from other patterns that correlate to this pattern. As noted, in embodiments, a large training data set may be obtained or accessed by a pattern matching system and used to determine correlations of the different call patterns to desired results actually obtained for these particular call patterns, e.g., a sale, retention of the caller in a program, call handle time, customer satisfaction, revenue, first call resolution, units sold, and transaction points, to name just a few. For example, it may be determined from the training data that the call pattern 100110100100 correlates to low sales potential, while the call pattern 001110110100 correlates to high sales potential. As noted above, in embodiments, instead of or in addition to determining a percentile or ranking of the respective pattern within a set of call patterns, the performance data/rating for the respective call pattern may be compared to one or more thresholds, or may be used with or without modification.

Block 920 represents an operation of obtaining, by the one or more computers, performance data for respective agents in a set of agents. As noted, this data may be obtained from the one or more databases. As noted, this operation may further comprise the operation of computing a percentile or ranking of the agents within the set of agents.

Block 930 represents an operation of determining, by the one or more computers, agent sensitivity to call performance for agents in a set of agents comprising the agent performance data correlated to call performance data for the calls the agent has handled. In embodiments, this operation may comprise the operation of correlating agent performance data to call performance data for the calls the agent has handled in a data set. In other words, a determination is made relative to other of the agents within a set of agents, whether there is data indicating that the respective agent performance highly correlates with call performance, e.g., there is high performance for most of the calls handled by this agent when the calls he/she is handling have high performance ratings, and/or low performance for most of the calls handled by the agent when the calls he/she is handling have low performance ratings. Alternatively, a low agent sensitivity or correlation with call performance would be indicated where the agent performance does not seem to substantially track with the level of call performance. In embodiments, this operation may also comprise a computation of the percentile or ranking of the agent performance sensitivity to call performance within the set of agents. In embodiments, instead of or in addition to determining a percentile or ranking within a set of agents of the respective agent for sensitivity to call pattern performance, the sensitivity data/rating for the respective agent may be compared to one or more thresholds, or may be used with or without modification.

In embodiments, Spearman or Pearson correlation may be used. In embodiments the matching engine may compute an (Bayesian regression) estimate of the difference in agent performance between the top performing half of call patterns and the bottom performing half of call patterns in the set of calls. In embodiments, the agent performance data for good call patterns, for example an average agent sales rate for call patterns in the top half of call pattern performance rankings can be subtracted or otherwise compared to an average agent sales rate for call patterns in the bottom half of call pattern performance. Thus, for example, agents with performance that are most highly correlated to performance of call patterns may, in embodiments, be matched to call patterns with highest performance percentiles or rankings.

In embodiments, agent sensitivity to call pattern performance may be calculated by:

1) Determining for the top half of ranked or percentiled call patterns handled by the particular agent in the training data set an average underlying performance;

2) Determining for the bottom half of the ranked or percentiled call patterns handled by the particular agent in the training data set an average underlying performance;

3) Subtracting the bottom half call pattern average underlying performance from the top half call pattern average underlying performance for the particular agent to obtain a performance difference number;

4) Comparing the performance difference number for this particular agent to a predetermined number or a sensitivity number determined on the fly; and 5) Ranking or percentiling this sensitivity number for the agents in the set of agents.

In embodiments, agent sensitivity to call pattern performance may be calculated by:

1) Estimate by Bayesian methods, the top half call pattern average underlying performance minus the top half call pattern average underlying performance for the particular agent to obtain a performance difference number;

2) Comparing the performance difference number for this particular agent to the performance difference number for other agents; and 3) Ranking or percentiling this performance difference number for the agent in the set of agents.

Note that embodiments of the present disclosure is not limited to a particular algorithm to be used to determine the sensitivity. Note that the call patterns in the set of call patterns may be grouped in more than two groups. Note that another number may be used in place of or in addition to the average. Note that in embodiments, percentiles or rankings may be used for matching, or raw or modified performance data and raw or modified sensitivity ratings may be used for matching.

Block 940 represents an operation of matching, by the one or more computers, a respective one of the agents from the set of agents to one of the calls based at least in part on the performance data for the respective pattern of the one call and on the agent sensitivity to call performance for the respective one agent of the set of agents. In embodiments, this operation may comprise matching, by the one or more computers, a respective one of the agents from the set of agents to one of the calls based at least in part on the percentile or ranking by performance data for the respective pattern of the one call and on the percentile or ranking of the agent sensitivity to call performance for the respective one agent. In other embodiments, the matching may be based at least in part on the raw or modified performance data/rating for the call pattern and/or the raw or modified sensitivity rating for the agent.

Figure 13:
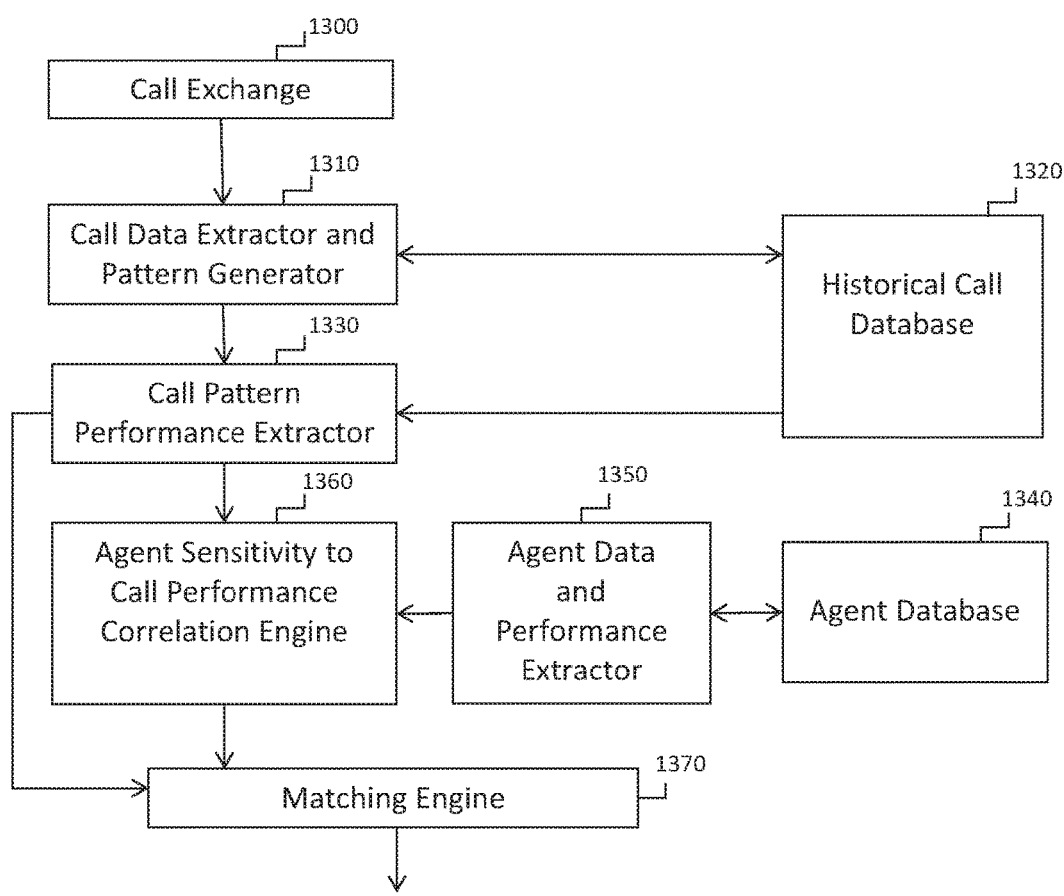
FIG. 13 is a system embodiment for implementing embodiments described herein based at least in part on agent sensitivity to call performance.

In embodiments, matching based at least in part on agent sensitivity to call performance may be implemented using a system as shown in FIG. 13. Referring to the figure, calls are obtained, e.g., either received or generated in a call exchange component 1300. A call data extractor and pattern generator 1310 may be used to extract call data from a historical call database 1320 to obtain a call pattern comprising one or more data fields of call data. The historical call database 1320 may include demographic data and/or psychographic data for the caller, skill requirements for previous calls, and outcomes of previous calls, to name a few of the items that may be available. This component may also extract call data from other databases and/or generate call data on the fly based on the call number or other call data.

A call pattern performance extractor component 1330 may be connected to receive the call pattern from the block 1310 and performance data from the historical call database 1320 to obtain performance data for a respective call pattern or to infer it from similar call patterns. In embodiments, the call performance extractor component 1330 may perform a percentiling or ranking operation to rank the pattern performance of the call against other calls in a set of calls.

Likewise, an agent data and performance extractor component 1350 may be connected to extract data from an agent database 1340 that contains demographic data and/or psychographic data and skill data and performance data for agents. In embodiments, the extractor component 1350 may be configured to obtain agent data for agents in a set of agents, e.g., agents that are currently available, or agents that are currently available or are soon to be available, or any other convenient set of agents selected based at least in part on one or more criteria, e.g., such as skill and/or call handle time, to name a few. In embodiments, the component 1350 may perform a percentiling or ranking operation to compute a percentile or ranking of the agents within a set of agents based at least in part on performance data for the agents.

In embodiments, an agent sensitivity to call performance correlation engine 1360 may receive inputs from the call pattern performance extractor component 1330 and from the agent data and performance extractor component 1350. The correlation engine 1360 performs a correlation of the performance for a selected agent in a set of agents to call performance for the calls the agent has handled in the past. In embodiments, this operation may comprise computing a percentile or ranking of the agents in a set of agents by agent performance sensitivity to call performance.

In embodiments, a matching engine 1370 performs matching of a respective one of the agents from the set of agents to one of the calls based at least in part on the performance data for the respective pattern of the one call and on the agent sensitivity to call performance for the respective one agent. The particular matching may be agents with high agent sensitivity to call performance matched to calls with high performance data, or any other matching criteria that may factor in other data elements such as skill, handle time, call type, etc. In embodiments, the matching may be based at least in part on matching percentiles or rankings of the agent sensitivity to call performance within the set of agents and the call performance within the set of calls.

In embodiments using agent sensitivity to call performance, it has been discovered that a switching between or among algorithms leads to better performance. In embodiments, the agents in a set of agents may be grouped into two or more groups based on one or more criteria. In embodiments, the groupings may be based on ranges of agent performance. In embodiments, the respective estimated performances of the agents in a set of agents may be ranked, and then grouped by percentiles or rankings into two or more groups, comprising one group in one performance range, and at least a different group that has a higher performance range relative to the one group, e.g., at least a top group and a bottom group, or a top group and a middle group and a low group, etc. Alternatively or in addition, the groupings may be based at least in part on ranges of raw or modified agent performance data. Note that the number of groups is not limiting on embodiments of the present disclosure. The groups do not have to have equal numbers in each group. For example, 25% of the agents could be in the low group percentile or ranking range, and 75% of the agents could be in the higher group of percentile or ranking ranges. Other examples, would be 50-50 groupings or 75-25 where two groups are used, or any other grouping ratio. The percentages of agents in the groups is not limiting on embodiments of the present disclosure and may be determined based on one or more criteria. For example, the ratio of agents in the groups may be determined empirically, and/or may be based at least in part on historical data in the one or more databases. Alternatively, in embodiments the ratios may be based at least in part on different ranges of raw or modified pattern performance data, and/or based on data availability ranges or any other criteria.

In embodiments, one group of agents may be matched to calls using a first algorithm, and a different group of the agents may be matched to calls using a second algorithm. For example, in embodiments agents in the lowest group of performance percentiles or rankings may be matched using an algorithm that matches based at least in part on call pattern performance percentile or ranking and agent performance percentile or ranking. Low agent performance percentiles or rankings of the low performing agent group may be matched with calls with low performance percentiles or rankings, e.g., 25% of the calls may be matched using this matching algorithm. Alternatively, agents in this low group with low agent performance percentiles or rankings may be matched with calls with patterns with higher performance percentiles or rankings. Agents in a higher group of performance percentiles or rankings may be matched using a different algorithm that matches based at least in part on a percentile or ranking of agent sensitivity to call pattern performance and call pattern performance percentile or ranking. For example, agents in this higher performance group may be matched so that agents with high agent sensitivity to call pattern performance are matched with call patterns that have a percentile or rank with a higher estimated performance. Alternatively, the matching may be based at least in part on raw or modified performance data.

Thus, in embodiments, for this higher performance group of agents, instead of matching agents with the highest performance percentiles or rankings with calls with the highest performance percentiles or rankings, matching may be performed by determining a respective agent's sensitivity to call performance, e.g., a percentile or ranking of agents based at least in part on a correlation between the agent performance and call pattern performance for the calls they have handled. Thus, high performance calls are not wasted on agents where call performance has a low influence on agent performance and ultimately the outcome for the call. These high performance calls are instead matched with agents where call pattern performance is expected to have a strong influence. In essence, the high performing calls are reserved and matched to agents where they will be most useful. This operation reduces a situation where a high performance call is not available for an agent that is highly influenced by call performance. Poorly ranked calls are matched where their low performance percentile or ranking will have the least adverse effect.

More generically, in other embodiments, a group of agents that are similar in one or more aspects, may be grouped, and one algorithm may be used with this group, and a different algorithm may be used with a different group having different characteristics. For example, one algorithm may be used where the system has a lot of current data for an agent. A different algorithm may be used where there is not a lot of data for the agent in the system. Thus, to facilitate this operation using multiple algorithms, the patterns may be grouped in multiple groups based on different amount ranges of current data for the respective agent. Alternatively or in addition, in embodiments grouping may be based at least in part on percentiles or rankings or ratings of the skills needed by the calls, and/or on the proficiency of the agents for a given skill. In such embodiments, the groupings may be low range and higher range groups of skill proficiency, or a low range, medium range, and high range skill proficiency, or any other number of groups based on skill proficiency ranges. Different matching algorithms may be used for the different groups. Alternatively or in addition, in embodiments grouping may be based at least in part on ranges of agent call handle time, or on ranges of estimated call handle time for call patterns. In such embodiments, the groupings may be low range and higher range groups of agent call handle time or pattern call handle time, or low range, medium range, and high range groups of agent call handle time or pattern call handle time, or any number of groups based on agent call handle time or pattern call handle time ranges. As noted, different matching algorithms may be used for the different groups. Thus, a variety of different groupings are contemplated. In embodiments, a cutoff between the different groups may be determined empirically or using one or more other criteria.

Figure 10A:
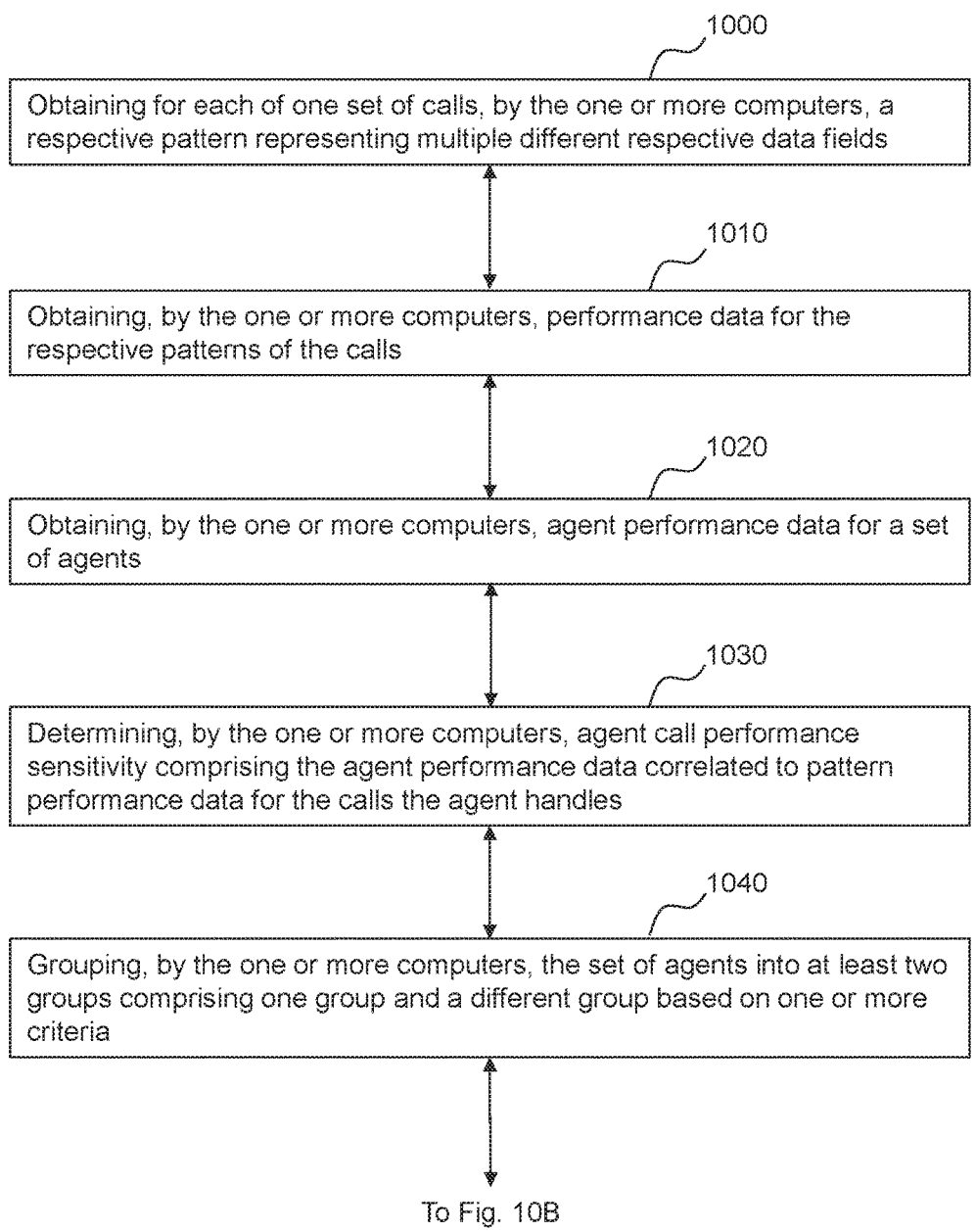
FIG. 10A is a flowchart reflecting further embodiments of the present disclosure for performing matching using agent sensitivity to call performance.
Figure 10B:
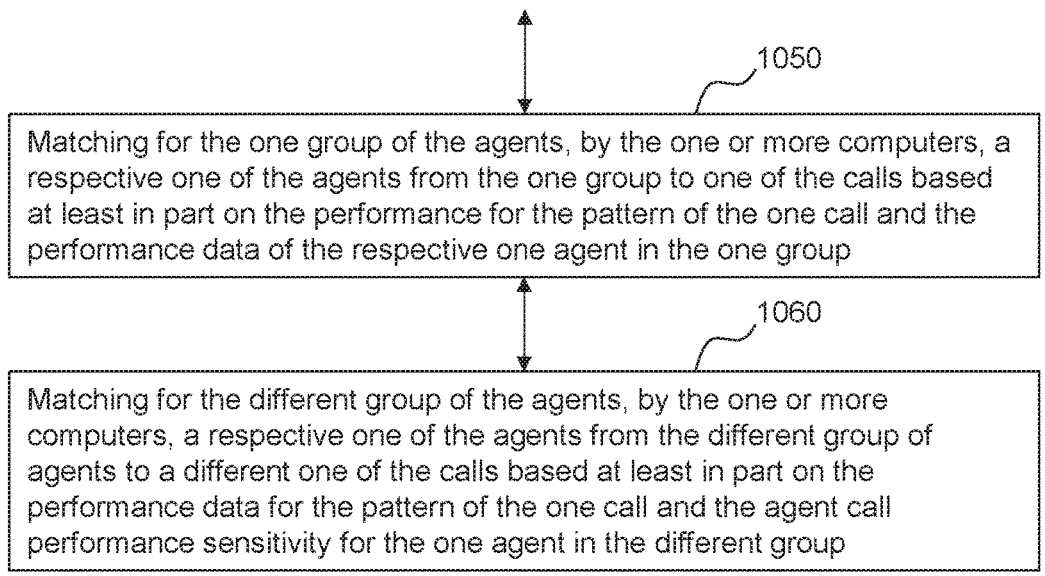
FIG. 10B is a continuation of the Flowchart of FIG. 10A.

Referring to FIG. 10, embodiments are illustrated using two different matching algorithms where at least one of the algorithms performs matching based at least in part on agent sensitivity to call performance. Block 1000 represents an operation of obtaining for each of one set of calls, by the one or more computers, a respective pattern representing one or multiple different respective data fields. In embodiments, this operation may comprise obtaining, by the one or more computers, a respective data stream for each of multiple calls, with each respective data stream having one or more different locations along the data stream representing one or more different respective fields. In embodiments, the data stream may be abstracted in whole or in part, so that the meaning for the data fields in the respective different locations is not known by the system. In embodiments, the operation may further comprise determining respective patterns, by the one or more computers, from respective field data positions in the respective data streams. In embodiments, these patterns may be patterns of 1's and 0's, or yes and no, or true and false, or binary, or integer only, or decimal, or other alphanumeric representations for the different fields. In embodiments, all or some of this data may comprise human interpretable field data. In embodiments, all of the positions in the data stream are used to form the respective pattern. In embodiments, only selected positions in the data stream are used to form the respective pattern.

Block 1010 represents an operation of obtaining, by the one or more computers, performance data for the respective patterns of the calls. In embodiments, this operation may comprise percentiling or ranking, by the one or more computers, the respective patterns of the calls within the set of calls based at least in part on performance data for the respective patterns. As noted above, in embodiments, instead of or in addition to determining a percentile or ranking of the respective pattern within a set of call patterns, the performance data/rating for the respective call pattern may be compared to one or more thresholds, or may be used with or without modification.

Block 1020 represents an operation of obtaining, by the one or more computers, agent performance data for respective agents in a set of agents. As noted, this data may be obtained from the one or more databases. In embodiments, this operation may comprise percentiling or ranking, by the one or more computers, agents in a set of agents based at least in part on agent performance. As noted above, in embodiments, instead of or in addition to determining a percentile or ranking of the respective agents within the set of agents, the performance data/rating for the respective agent may be compared to one or more thresholds, or may be used with or without modification.

Block 1030 represents an operation of determining, by the one or more computers, agent performance sensitivity to call pattern performance comprising the agent performance data correlated to pattern performance data for calls the agent has handled. In embodiments, this operation may comprise the operation of correlating agent performance to call performance data for the calls the agent has handled in a data set. In embodiments, this operation may comprise percentiling or ranking, by the one or more computers, agents in the set of agents based at least in part on agent performance sensitivity to call pattern performance comprising agent performance correlated to performance data for the respective pattern to obtain a respective agent percentile or ranking for agent sensitivity to call performance for the respective agents. In embodiments, instead of or in addition to determining a percentile or ranking within a set of agents of the respective agent for sensitivity to call pattern performance, the sensitivity data/rating for the respective agent may be compared to one or more thresholds, or may be used with or without modification.

Block 1040 represents an operation of grouping, by the one or more computers, the set of agents into at least two groups comprising one group and a different group based on one or more criteria. In embodiments, the grouping may be based at least in part on the agent performance data. In embodiments, the groupings may be based at least in part on the performance percentiles or rankings of the agents within the set of agents, with the agents in one of the groups having lower percentiles or rankings than agents in the other of the groups. Alternatively, the groupings may be based at least in part on different ranges of raw or modified agent performance data. The number of groups is not limiting on embodiments of the present disclosure. For example, there may be two groups, e.g., a low performance range group and a high performance range group, or three groups, or four groups, or more. Examples where two groups are used may have grouping ratios of 25-75, and 50-50, 75-25, or any other grouping ratio. The percentages of the set of agents in the different groups is not limiting on embodiments of the present disclosure and may be determined based on one or more criteria. For example, the ratio of agents in the groups may be determined empirically, and/or may be based at least in part on historical data in the one or more databases.

In embodiments, the groupings may be based at least in part on pattern performance ranges. In embodiments, the groupings may be based at least in part on data volume ranges for the respective agents, e.g., how much data is available in the one or more databases for the respective agents.

Block 1050 represents an operation of matching for the one group of the agents, by the one or more computers, a respective one of the agents from the one group to one of the calls using a first algorithm. In embodiments, the matching for the one group of the agents, by the one or more computers, a respective one of the agents from the one group to one of the calls may be based at least in part on the performance data for the pattern of the one call and the performance data of the respective one agent in the one group. In embodiments, matching for the one group of the agents may be based at least in part on the call percentile or ranking by performance for the pattern of the one call and the agent percentile or ranking by performance of the respective one agent in the one group. For example, the matching step for the one group may comprise matching agents in a low percentile or ranking group based at least in part on the percentile or ranking by performance data for the agents in the one group and the percentile or ranking by performance data for the respective patterns of the calls. Alternatively, the groups and the matching may be reversed. As noted, in embodiments, the matching may instead or in addition be based at least in part on the raw or modified performance data/rating for the agents and/or the raw or modified performance data/rating for the call patterns.

Block 1060 represents an operation of matching for the different group of the agents, by the one or more computers, a respective one of the agents from the different group of agents to a different one of the calls using a second algorithm. In embodiments, the matching for the different group of the agents, by the one or more computers, a respective one of the agents from the different group of agents to a different one of the calls may be based at least in part on the performance data for the pattern of the one call and the agent performance sensitivity to call pattern performance for the one agent in the different group. In embodiments, the matching for the different group of the agents may be based at least in part on the call percentile or ranking by the performance data for the pattern of the one call and the agent percentile or ranking by call performance sensitivity for the one agent in the different group. Thus, in embodiments, the matching step for the different group may comprise matching agents in a higher percentile or ranking group based at least in part on performance data for the call patterns, and on agent performance sensitivity to call performance in this different group. In embodiments, the matching may instead or in addition be based at least in part on the raw or modified performance data/ratings for the call pattern and/or the raw or modified sensitivity rating for the agent. Thus, high performance calls are not wasted on agents where call performance has a low influence on the outcome for the call. These high performance calls are instead matched with agents where call performance is expected to have a strong influence. In essence, the high performing calls are reserved and matched to agents where they will be most useful.

In embodiments, the matching steps may be performed concurrently. In embodiments, the matching steps may be performed consecutively or may have overlapping performance. In embodiments, a percentile or ranking break point between the one group and the different group may be determined based on one or more criteria. As noted, one criterion may be to determine the percentile or ranking cutoff point empirically, and/or may be based at least in part on historical data in the one or more databases or on a level of data availability for the agent of the pattern.

In embodiments, the further operations may be performed of matching, by the one or more computers, a different set of calls to agents using a different matching algorithm. For example, the different algorithm may be a random matching based at least in part on call position in a queue or length of time of a call in a pool of callers. The operation may be performed of comparing, performance from call-agent matches of the different set of calls using the different matching algorithm with performance for the one set of calls using a combination of the matching of the one group of agents to calls using the first algorithm and the matching of the different group of agents to calls using the second algorithm. In embodiments, a further operation may be performed of generating, by the one or more computers, a report or display data for the performance comparing results from using the combination of matching algorithms against performance using the different matching algorithm.

Figure 14:
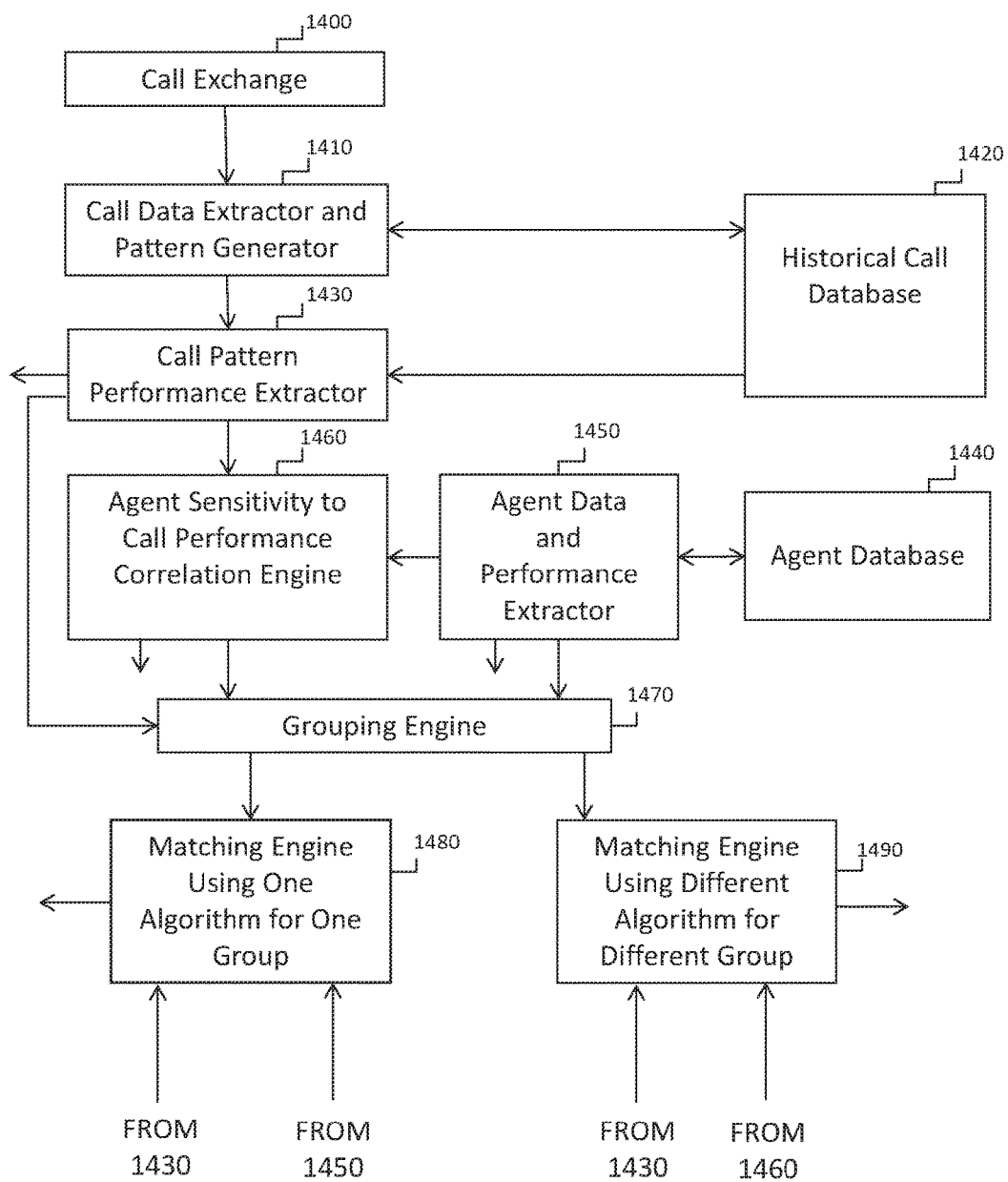
FIG. 14 is a system embodiment for implementing embodiments described herein based at least in part on groupings using multiple matching algorithms and call pattern sensitivity to agent performance.

In embodiments, the matching based at least in part on switching between two or more matching algorithms using grouping and based at least in part on agent sensitivity to call performance may be implemented using a system as shown in FIG. 14. Referring to the figure, calls are obtained, e.g., either received or generated in a call exchange component 1400. A call data extractor and pattern generator 1410 may be used to extract call data from an historical call database 1420 to obtain a call pattern comprising one or more data fields of call data. The historical call database 1420 may include demographic data and/or psychographic data for the caller, skill requirements for previous calls, and outcomes of previous calls, to name a few of the items that may be available. This call data extractor and pattern generator component 1410 may also extract call data from other databases and/or generate call data on the fly based on the call number or other call data.

A call pattern performance extractor component 1430 may be connected to receive the call pattern from the block 1410 and to obtain performance data for the respective call pattern from the historical call database 1420 or to infer it from similar call patterns. In embodiments, the call performance extractor component 1430 may comprise performing a percentiling or ranking computation operation to percentile or rank the pattern performance for the call against other calls in a set of calls.

Likewise, an agent data and performance extractor component 1450 may be connected to extract data from an agent database 1440 that contains demographic data and/or psychographic data and skill data and performance data for agents. In embodiments, the extractor component 1450 may be configured to obtain agent data for agents in a set of agents, e.g., agents that are currently available, or agents that are currently available or are soon to be available, or any other convenient set of agents selected based at least in part on one or more criteria such as skill and/or call handle time, to name a few. In embodiments, the agent data and performance extractor component 1450 may perform a percentiling or ranking operation to compute a percentile or to rank the agents within a set of agents based at least in part on performance data for the agents.

In embodiments, an agent sensitivity to call performance correlation engine 1460 may receive inputs from the call pattern performance extractor 1430 and from the agent data and performance extractor component 1450, and generate a correlation of the performance for a selected one of the agents to call performance for calls this agent has handled in the past. In embodiments, this operation may comprise the operation of computing a percentile or a ranking for the agents in the set of calls by agent performance sensitivity to call performance.

In embodiments, a grouping engine 1470 may be provided to group the agents into two or more groups based on one or more criteria. In embodiments, the agent grouping may be based at least in part on agent performance ranges, as previously described. In other embodiments, the groupings may be based at least in part on volume ranges for agent data, ranges of call handle time, skill level ranges, call performance ranges, to name a few. The grouping engine 1470 is shown in the figure as receiving inputs from any of blocks 1430, 1450, 1460, and/or potentially may also receive an input from block 1410, depending on the one of more parameters used for the grouping.

In embodiments, a matching engine 1480 using one algorithm may be used for one group of agents by matching one of the agents from the one group of agents to one of the calls in the set of calls based at least in part on the performance data for the pattern of the one call and the performance data of the respective one agent in the one group. In embodiments, the matching may be based at least in part on matching percentiles or rankings of the call pattern performance within the set of calls and the percentiles or rankings of the agent performance within the one group of agents. Block 1480 illustrates an embodiment where inputs are taken from blocks 1430 and 1450.

In embodiments, a matching engine 1490 using a different algorithm may be used for an agent in a different group of the agents to a different call in the set of calls by selecting based at least in part on the performance data for the pattern of the one call and based at least in part on the agent performance sensitivity to call performance for the one agent in the different group. In embodiments, the particular matching may be agents with high agent sensitivity to call performance matched to calls with high performance data, or any other matching criteria that may factor in other data elements such as skill, handle time, call type, etc. In embodiments, the matching may be based at least in part on matching percentiles or rankings of the agent sensitivity to call performance within the set of agents and the call performance within the set of calls. Block 1490 illustrates an embodiment where inputs are taken from blocks 1430 and 1460.

In embodiments, a method, system and program product for operating a call center, may comprise combining the agent sensitivity to call performance and the call pattern sensitivity to agent performance in a matching algorithm. In embodiments, an example may comprise obtaining for each call in one set of calls, by the one or more computers, a respective pattern representing multiple different respective data fields; obtaining, by the one or more computers, performance data for the respective patterns of the calls; obtaining, by the one or more computers, performance data for the respective agents; determining, by the one or more computers, agent sensitivity to call performance for agents in a set of agents comprising the agent performance data correlated to call performance data for the calls the agent handles; determining, by the one or more computers, pattern performance sensitivity to agent performance comprising the pattern performance data correlated to agent performance data; and matching, by the one or more computers, a respective one of the agents from the set of agents to one of the calls based at least in part on the pattern performance sensitivity to agent performance for the respective pattern of the one call and on the agent sensitivity to call performance for the respective one agent of the set of agents.

In embodiments, the same permutations may be used for these embodiments as are set forth above for other embodiments. For example, the agents may be percentiled or ranked based at least in part on their sensitivity to call performance and the calls may be percentiled or ranked based at least in part on their sensitivity to agent performance, and matching may be performed based at least in part on these percentiles or rankings. Likewise, there could be a grouping of the calls and/or of the agents based on one or more criteria, e.g., by performance ranges, or handle time ranges, or regions or other demographic aspects, to name a few possible grouping criteria. Then different algorithms may be used for matching the different groups. For example, matching of calls to agents for one group may be performed based at least in part on call performance sensitivity to agent performance, and a different group may be matched based at least in part on agent performance sensitivity to call performance.

In embodiments, the same weighting algorithms as described above may be used for the agent sensitivity embodiments described above, e.g., the agent performance may be weighted, and/or the call performance may be weighted, and/or the agent performance sensitivity to call performance may be weighted, and/or the call sensitivity to agent performance may be weighted.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 6:
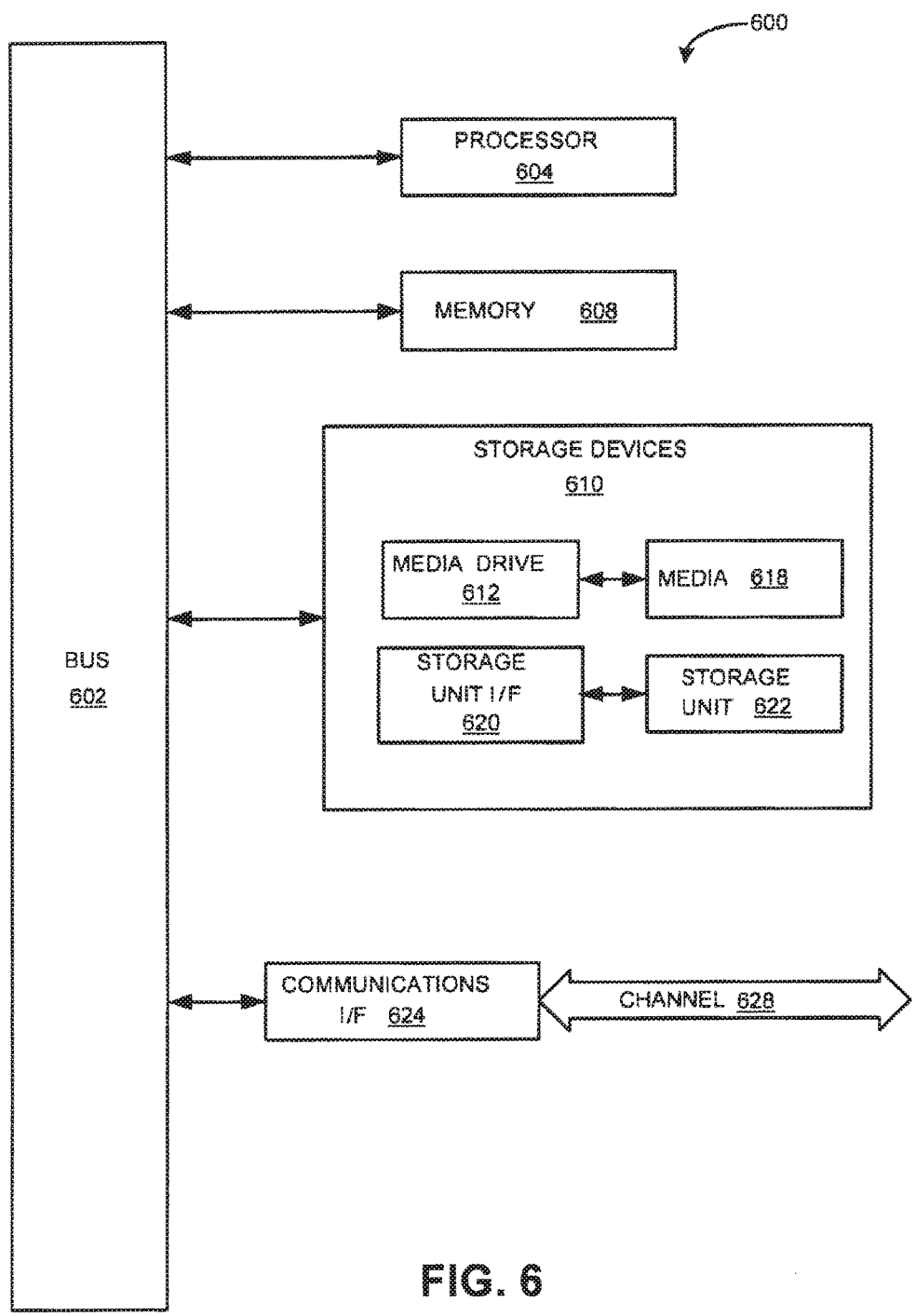
FIG. 6 illustrates a typical computing system that may be employed to implement some or all processing functionality in certain embodiments of the present disclosure.

FIG. 6 illustrates a typical computing system 600 that may be employed to implement processing functionality in embodiments of the present disclosure. Computing systems of this type may be used in clients and servers, for example. Those skilled in the relevant art will also recognize how to implement embodiments of the present disclosure using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 612. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 608, storage media 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present disclosure. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage media 618, drive 612 or communications interface 624. The control logic (in this example, software instructions or computer program code), when executed by the processor 604, causes the processor 604 to perform the functions of embodiments of the present disclosure as described herein.

It will be appreciated that, for clarity purposes, the above description has described embodiments of the present disclosure with reference to different functional units and processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the present disclosure. Likewise, software and web implementations of the present disclosure could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the." When it is stated that one of A and B, it means that one is selected from the group of A and B.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments disclosed herein to form an embodiment with this added element or step, unless a statement herein explicitly prohibits this combination.

The above-described embodiments of the present disclosure are merely meant to be illustrative and not limiting. Various changes and modifications may be made without departing from the present disclosure in its broader aspects. The appended claims encompass such changes and modifications within the spirit and scope of the present disclosure.

The invention claimed is:

1. A method for pairing in a contact center system comprising:

determining, by at least one computer processor communicatively coupled to and configured to operate in the contact center system, contact pattern performance data for a contact;

determining, by the at least one computer processor, agent performance data for each of a plurality of agents;

calculating, by the at least one computer processor, a degree of contact pattern sensitivity for the contact to the agent performance data for each of the plurality of agents based on the agent performance data and the contact pattern performance data;

comparing, by the at least one computer processor, the degree of contact pattern sensitivity to a threshold degree of contact pattern sensitivity for at least a first agent having a first agent performance as compared to at least a second agent having a second agent performance;

applying, by the at least one computer processor, a first matching strategy for pairing the contact with the first agent of the plurality of agents based on the degree of contact pattern sensitivity for the contact to the agent performance data of the first agent; and establishing, by a routing engine of the contact center system, a communications channel between communication equipment of the contact and communication equipment of the first agent based upon the first matching strategy to realize a first amount of performance gain for the contact center system attributable to the first matching strategy.

2. The method of claim 1, further comprising:
correlating, by the at least one computer processor, the agent performance data to the contact pattern performance data from a data set indicating at least one contact pattern with which at least one of the plurality of agents has previously handled.

3. The method of claim 1, further comprising:
ranking, by the at least one computer processor, each of the plurality of agents based on the degree of contact pattern sensitivity to the agent performance data of each of the plurality of agents,
wherein the pairing is based on the ranking of each of the plurality of agents.

4. The method claim 1, wherein a contact pattern for the contact is based on an abstract contact data field.

5. The method of claim 1, wherein the agent performance data is based on data for at least one of sales, customer retention, contact handle time, customer satisfaction, revenue, first call resolution, units sold, or transaction points.

6. The method of claim 1, further comprising:
comparing, by the at least one computer processor, a first measure of contact center performance for a first set of contact-agent pairs based on the degree of contact pattern sensitivity to the agent performance data with a second measure of contact center performance for a second set of contact-agent pairs based on a second pairing strategy.

7. The method of claim 1, further comprising:
outputting, by the at least one computer processor, contact center performance data based on a first set of contact-agent pairs based on the degree of contact pattern sensitivity to the agent performance data.

8. A system for pairing in a contact center system comprising:
at least one computer processor communicatively coupled to and configured to operate in the contact center system, wherein the at least one computer processor is further configured to:
determine agent performance data for each of a plurality of agents;
determine contact pattern performance data for a contact;
calculate a degree of contact pattern sensitivity for the contact to the agent performance data for each of the plurality of agents based on the agent performance data and the contact pattern performance data;
compare the degree of contact pattern sensitivity to a threshold degree of contact pattern sensitivity for at least a first agent having a first agent performance as compared to at least a second agent having a second agent performance;
apply a first matching strategy for pairing the contact with the first agent of the plurality of agents based on the degree of contact pattern sensitivity for the contact to the agent performance data of the first agent; and
establish, in a routing engine of the contact center system, a communications channel between communication equipment of the contact and communication equipment of the first agent based upon the first matching strategy to realize a first amount of performance gain for the contact center system attributable to the first matching strategy.

9. The system of claim 8, wherein the at least one computer processor is further configured to:
correlate the agent performance data to the contact pattern performance data from a data set indicating at least one contact pattern with which at least one of the plurality of agents has previously handled.

10. The system of claim 8, wherein the at least one computer processor is further configured to:
rank each of the plurality of agents based on the degree of contact pattern sensitivity to the agent performance data of each of the plurality of agents,
wherein the pairing is based on the ranking of each of the plurality of agents.

11. The system of claim 8, wherein a contact pattern for the contact is based on an abstract contact data field.

12. The system of claim 8, wherein the agent performance data is based on data for at least one of sales, customer retention, contact handle time, customer satisfaction, revenue, first call resolution, units sold, or transaction points.

13. The system of claim 8, wherein the at least one computer processor is further configured to:
compare a first measure of contact center performance for a first set of contact-agent pairs based on the degree of contact pattern sensitivity to the agent performance data with a second measure of contact center performance for a second set of contact-agent pairs based on a second pairing strategy.

14. The system of claim 8, wherein the at least one computer processor is further configured to:
output contact center performance data based on a first set of contact-agent pairs based on the degree of contact pattern sensitivity to the agent performance data.

15. An article of manufacture for pairing in a contact center system comprising:
a non-transitory processor readable medium; and
instructions stored on the medium;
wherein the instructions are configured to be readable from the medium by at least one computer processor communicatively coupled to and configured to operate in the contact center system and thereby cause the at least one computer processor to operate so as to:
determine agent performance data for each of a plurality of agents;
determine contact pattern performance data for a contact;

calculate a degree of contact pattern sensitivity for the contact to the agent performance data for each of the plurality of agents based on the agent performance data and the contact pattern performance data;

compare the degree of contact pattern sensitivity to a threshold degree of contact pattern sensitivity for at least a first agent having a first agent performance as compared to at least a second agent having a second agent performance;

apply a first matching strategy for pairing the contact with the first agent of the plurality of agents based on the degree of contact pattern sensitivity for the contact to the agent performance data of the first agent; and establish, in a routing engine of the contact center system, a communications channel between communication equipment of the contact and communication equipment of the first agent based upon the first matching strategy to realize a first amount of performance gain for the contact center system attributable to the first matching strategy.

16. The article of manufacture of claim 15, wherein the instructions further cause the at least one computer processor to operate so as to:

correlate the agent performance data to the contact pattern performance data from a data set indicating at least one contact pattern with which at least one of the plurality of agents has previously handled.

17. The article of manufacture of claim 15, wherein the instructions further cause the at least one computer processor to operate so as to:

rank each of the plurality of agents based on the degree of contact pattern sensitivity to the agent performance data of each of the plurality of agents, wherein the pairing is based on the ranking of each of the plurality of agents.

18. The article of manufacture of claim 15, wherein a contact pattern for the contact is based on an abstract contact data field.

19. The article of manufacture of claim 15, wherein the agent performance data is based on data for at least one of sales, customer retention, contact handle time, customer satisfaction, revenue, first call resolution, units sold, or transaction points.

20. The article of manufacture of claim 15, wherein the instructions further cause the at least one computer processor to operate so as to:

compare a first measure of contact center performance for a first set of contact-agent pairs based on the degree of contact pattern sensitivity to the agent performance data with a second measure of contact center performance for a second set of contact-agent pairs based on a second pairing strategy.

* * * * *